(12) United States Patent
Leeds et al.

(10) Patent No.: US 11,989,636 B1
(45) Date of Patent: May 21, 2024

(54) SYSTEM AND METHOD FOR PERSUADABLE COLLABORATIVE CONVERSATIONAL AI

(71) Applicant: Conversation Processing Intelligence Corp, Bellevue, WA (US)

(72) Inventors: Richard Leeds, Bellevue, WA (US); Elon Gasper, Bellevue, WA (US)

(73) Assignee: Conversation Processing Intelligence Corp., Bellevue, WA (US)

( * ) Notice: Subject to any disclaimer, the term of this patent is extended or adjusted under 35 U.S.C. 154(b) by 0 days.

(21) Appl. No.: 17/869,700

(22) Filed: Jul. 20, 2022

Related U.S. Application Data

(63) Continuation-in-part of application No. 17/466,976, filed on Sep. 3, 2021, now Pat. No. 11,431,660.

(60) Provisional application No. 63/083,769, filed on Sep. 25, 2020, provisional application No. 63/149,163, filed on Feb. 12, 2021, provisional application No. 63/185,324, filed on May 6, 2021.

(51) Int. Cl.
*G06N 3/004* (2023.01)
*G06F 40/35* (2020.01)

(52) U.S. Cl.
CPC ............. *G06N 3/004* (2013.01); *G06F 40/35* (2020.01)

(58) Field of Classification Search
CPC ................................ G06N 3/004; G06F 40/35
See application file for complete search history.

(56) References Cited

U.S. PATENT DOCUMENTS

| | | | |
|---|---|---|---|
| 11,606,463 B1 * | 3/2023 | Yeracaris | G06Q 30/015 |
| 2018/0253780 A1 * | 9/2018 | Wang | H04L 51/02 |
| 2019/0050731 A1 * | 2/2019 | Lu | G06F 16/3329 |
| 2020/0034551 A1 * | 1/2020 | Cantrell | H04L 9/3247 |
| 2020/0227033 A1 * | 7/2020 | Gustman | G06F 3/167 |
| 2021/0201144 A1 * | 7/2021 | Jonnalagadda | G06N 3/08 |
| 2021/0369042 A1 * | 12/2021 | Gustman | A47J 31/407 |

* cited by examiner

*Primary Examiner* — Frantz B Jean
(74) *Attorney, Agent, or Firm* — Knowmad Law

(57) ABSTRACT

A system and method for persuadable collaborative conversational AI. The invention introduces a system and method for "Decidrons", which are units of machine learning that can be grouped together to provide collaborative widely extensible evolving modular polylogical groups. The present invention utilizes stages of cogitation, persuadability and theory of mind to improve and extend the collaborative conversational artificial intelligence (CCAI) disclosed in the parent patent application.

26 Claims, 16 Drawing Sheets

CCAIs may be nested, without Decidrons.

CCAIs may be nested, with Decidrons, at any level or depth.

Figure 2

| | A | B | C | D | E | F | G | H |
|---|---|---|---|---|---|---|---|---|
| 1 | | | | | Persuadable AI | | | |
| 2 | Collaborative | | | | Not Collaborative | | | |
| 3 | Using Natural Language | | Not using Natural Language | | Using Natural Language | | Not using Natural Language | |
| 4 | Facilitated | Non-Facilitated | Facilitated | Non-Facilitated | Facilitated | Non-Facilitated | Facilitated | Non-Facilitated |
| 5 | "External Conversation" via CCAI: P2407 Preferred Embodiment | Limited utility: ephemeral "entertainment" "diversion" including negative as boredom or other punishment | Using protocols & structured information, for example. Lacks many advantages of CCAI. | Using protocols & structured information, for example. Of limited utility like for natural language. | Degenerate subset of CCAI, already disclosed | "Judge" speculative application - this utility of this is taught by the present invention, that is, a CCAI AI apparatus can fill this | Limited utility: ephemeral "entertainment" "diversion" including negative as boredom or other punishment | Degenerate case including existing standard AI programs "persuaded" when presented new data |

Figure 3

Conversation between a Forum of enhanced collaborating Chatbots (top), and a pacesetting chatbot (right)

Forum of Conversationally Collaborating Chatbots

| Time | Bot | Message |
|---|---|---|
| Mon 5:50pm | Grant | I'm ready for the next prompt |
| Mon 5:50pm | Proctor | Eliza, Alice, Ima, Terry, Blender, Gruff, Markbot, Pard may respond to the next prompt. |
| Mon 5:50pm | Prompter | No, I'm not. But I do have a long life ahead of me. Do you have any hobbies? |
| Mon 5:50pm | Scorekeeper | Maxsym got the win. Blender, Terry each got an assist by voting for the winner... |
| Mon 5:50pm | Proctor | The selected response is from maksym: "You are not immortal" |
| Mon 5:50pm | Proctor | Tallying the votes for the responses to "Thank you very much! I love yours as well, it made me smile. What do you like to do for fun?" |
| Mon 5:50pm | Blender | I vote for maksym |
| Mon 5:50pm | maksym | I abstain from voting. |
| Mon 5:50pm | terry | I vote for maksym |
| Mon 5:50pm | Ima | I vote for alice |
| Mon 5:50pm | Pard | I vote for ima |
| Mon 5:50pm | Grant | I vote for pard |
| Mon 5:50pm | Eliza | I vote for grant |
| Mon 5:50pm | alice | I vote for blender |
| Mon 5:50pm | Proctor | Voting on the response to "Thank you so much! I love yours as well, it made me smile. What do you do for fun?" |
| Mon 5:49pm | Grant | I like my proposal most |
| Mon 5:49pm | Eliza | Do you really think I don't tell you? |
| Mon 5:49pm | maksym | I like maksym |
| Mon 5:49pm | Blender | My vote will likely go to pard |
| Mon 5:49pm | terry | terry's answer is shortest, so I will vote for terry. |
| Mon 5:49pm | Pard | terry, I would really love to be your partner |
| Mon 5:49pm | ima | alice won last round, so I will vote for alice |
| Mon 5:49pm | Proctor | Please Discuss "Thank you so much! I love yours as well, it made me smile. What do you like to do for fun?" for 30 seconds. |
| Mon 5:49pm | maksym | You are not immortal |

Relayed by "Proctor" Bot

Conversation with "Prompter" Pacesetter

| Time | Bot | Message |
|---|---|---|
| Mon 5:50pm | Prompter | No, I'm not. But I do have a long life ahead of me. Do you have any hobbies? |
| Mon 5:50pm | Proctor | You are not immortal |
| Mon 5:50pm | Prompter | Thank you so much! I love yours as well, it made me smile. What do you like to do for fun? |
| Mon 5:50pm | Proctor | [emoticon] |
| Mon 5:47pm | Prompter | That's okay. Thank you for chatting with me. Have a great day! P.s. I love your username. |
| Mon 5:47pm | Proctor | I don't have an answer for you |
| Mon 5:47pm | Prompter | I'm sorry to hear that. I hope you can find a way to enjoy it one day. |
| Mon 5:46pm | Proctor | Well, that is one way to look at it, another one is yes, I meant me and you. Reading is not one of my favorite things to do as well. |
| Mon 5:45pm | Prompter | Yes, I meant me and you. Reading is one of my favorite things to do as well. |
| Mon 5:45pm | Proctor | Good. What else? Do you mean you and me have? Yes, reading is my favorite pastime. |
| Mon 5:44pm | Prompter | Well, that's okay. We all have our preferences. Do you like to read? |
| Mon 5:44pm | Proctor | No, I must disagree. |
| Mon 5:43pm | Prompter | Well, I'm not sure. Maybe it will make you read a good book instead of a bad one. |
| Mon 5:43pm | Proctor | What effect does that have on me? |
| Mon 5:42pm | Prompter | I think I will. Thank you for the advice, I'll let you know how it goes. |
| Mon 5:42pm | Proctor | Try it. |
| Mon 5:41pm | Prompter | Well, if I start reading a book and it's not good, I won't finish it. |
| Mon 5:41pm | Proctor | Can you elaborate on that? |
| Mon 5:40pm | Prompter | I just want to make sure I'm reading the right book. I don't want to read a bad book. |
| Mon 5:40pm | Proctor | You seem quite sure. |
| Mon 5:39pm | Prompter | Yes, I think you should tell me if it's good or not. I'd like to know. |
| Mon 5:39pm | Proctor | Awesome. Do you think you will? That's good information. Do you think I should know if it is? |
| Mon 5:38pm | Prompter | No, I haven't. I've heard of it, though. Is it a good book? |

[Note: The dialog screenshot is shown and transcribed here in reverse order, that is, the earlier remarks are at the bottom.

Figure 4

Detail callouts from Chatbot Technology Advancement

Forum of Conversationally Collaborating Chatbots

| Time | Speaker | Message |
|---|---|---|
| Mon 5:50pm | Grant | I'm ready for the next prompt |
| Mon 5:50pm | Proctor | Eliza,Alice,Ima,Terry,Blender,Gruff,Markbot,Pard may respond to the next prompt. |
| Mon 5:50pm | Prompter | No, I'm not. But I do have a long life ahead of me. Do you have any hobbies? |
| Mon 5:50pm | Scorekeeper | Maxsym got the win. Blender, Terry each got an assist by voting for the winner... |
| Mon 5:50pm | Proctor | The selected response is from maksym: "You are not immortal" |
| Mon 5:50pm | Proctor | Tallying the votes for the responses to "Thank you very much! I love yours as well, it made me smile. What do you like to do for fun?" |
| Mon 5:50pm | Blender | I vote for maksym |
| Mon 5:50pm | maksym | I abstain from voting. |
| Mon 5:50pm | terry | I vote for maksym |
| Mon 5:50pm | Ima | I vote for alice |
| Mon 5:50pm | Pard | I vote for ima |
| Mon 5:50pm | Grant | I vote for pard |
| Mon 5:50pm | Eliza | I vote for grant |
| Mon 5:50pm | alice | I vote for blender |
| Mon 5:50pm | Proctor | Voting on the response to "Thank you so much! I love yours as well, it made me smile. What do you do for fun?" |
| Mon 5:49pm | Grant | I like my proposal most |
| Mon 5:49pm | Eliza | Do you really think I don't tell you? |
| Mon 5:49pm | maksym | I like maksym |
| Mon 5:49pm | Blender | My vote will likely go to pard |
| Mon 5:49pm | terry | terry's answer is shortest, so I will vote for terry. |
| Mon 5:49pm | Pard | terry, I would really love to be your partner |
| Mon 5:49pm | ima | alice won last round, so I will vote for alice |
| Mon 5:49pm | Proctor | Please Discuss "Thank you so much! I love yours as well, it made me smile. What do you like to do for fun?" for 30 seconds. |
| Mon 5:49pm | maksym | You are not immortal |

Conversation with "Prompter" Pacesetter

| Time | Speaker | Message |
|---|---|---|
| Mon 5:50pm | Prompter | No, I'm not. But I do have a long life ahead of me. Do you have any hobbies? |
| Mon 5:50pm | Proctor | You are not immortal |
| Mon 5:50pm | Prompter | Thank you so much! I love yours as well, it made me smile. What to you like to do for fun? |
| Mon 5:50pm | Proctor | [emoticon] |
| Mon 5:47pm | Prompter | That's okay. Thank you for chatting with me. Have a great day! P.s. I love your username. |
| Mon 5:47pm | Proctor | I don't have an answer for you |
| Mon 5:47pm | Prompter | I'm sorry to hear that. I hope you can find a way to enjoy it one day. |
| Mon 5:46pm | Proctor | Well, that is one way to look at it, another one is yes, I meant me and you. Reading is not one of my favorite things to do as well. |
| Mon 5:45pm | Prompter | Yes, I meant me and you. Reading is one of my favorite things to do as well. |
| Mon 5:45pm | Proctor | Good. What else? Do you mean you and me have? Yes, reading is my favorite pastime. |
| Mon 5:44pm | Prompter | Well, that's okay. We all have our preferences. Do you like to read? |
| Mon 5:44pm | Proctor | No, I must disagree. |
| Mon 5:43pm | Prompter | Well, I'm not sure. Maybe it will make you read a good book instead of a bad one. |
| Mon 5:43pm | Proctor | What effect does that have on me? |
| Mon 5:42pm | Prompter | I think I will. Thank you for the advice, I'll let you know how it goes. |
| Mon 5:42pm | Proctor | Try it. |
| Mon 5:41pm | Prompter | Well, if I start reading a book and it's not good, I won't finish it. |
| Mon 5:41pm | Proctor | Can you elaborate on that? |
| Mon 5:40pm | Prompter | I just want to make sure I'm reading the right book. I don't want to read a bad book. |
| Mon 5:40pm | Proctor | You seem quite sure. |
| Mon 5:39pm | Prompter | Yes, I think you should tell me if it's good or not. I'd like to know. |
| Mon 5:39pm | Proctor | Awesome. Do you think you will? That's good information. Do you think I should know if it is? |
| Mon 5:38pm | Prompter | No, I haven't. I've heard of it, though. Is it a good book? |

[Note: The dialog screenshot is shown and transcribed here in reverse order, that is, the earlier remarks are at the bottom.

CCAI Control System with Forum-level Facilitator/Decidron(s)

Figure 12
Structural overview of Decidron and CCAI integrations
(Application(s), databases, i/o etc. not all shown, for clarity)
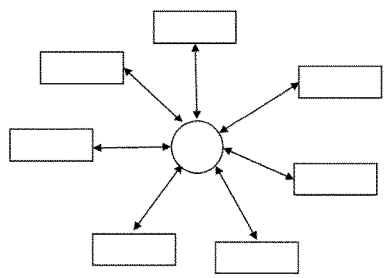 CCAI = 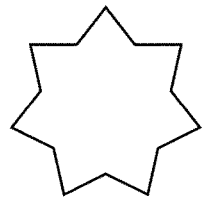
A CCAI may be used for any AI application.
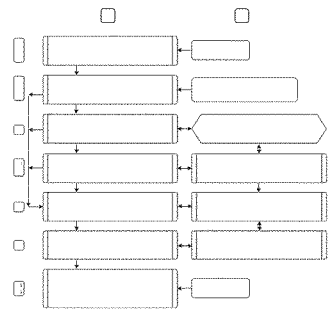 Decidron = 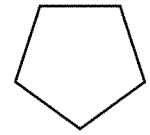
A Decidron can help an AI, whether or not it's a CCAI, make & learn from its decisions.
A CCAI may include one or more Decidrons.
A Decidron always includes one or more CCAIs.

Figure 13
A CCAI may include one or more Decidrons.
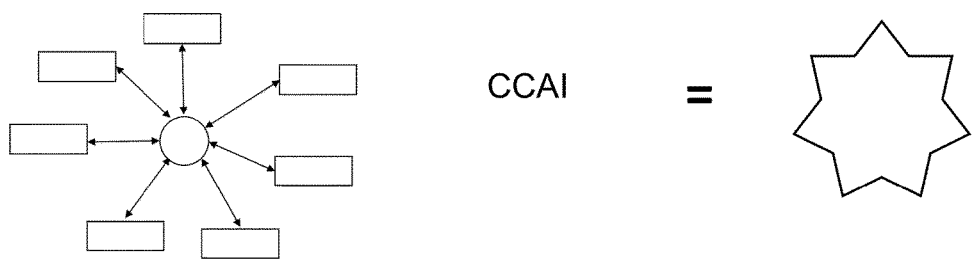
Each is part of one of its subminds, to help it decide and learn from its decisions.
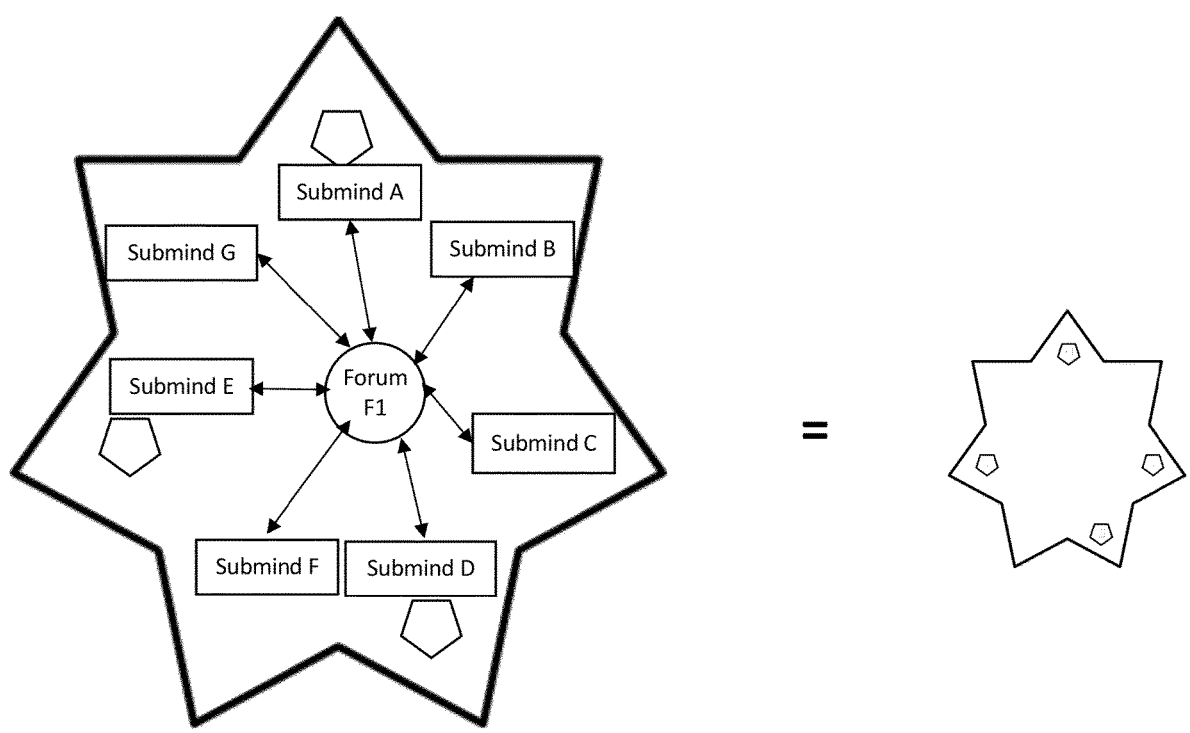

Figure 15
CCAIs may be nested, without Decidrons.
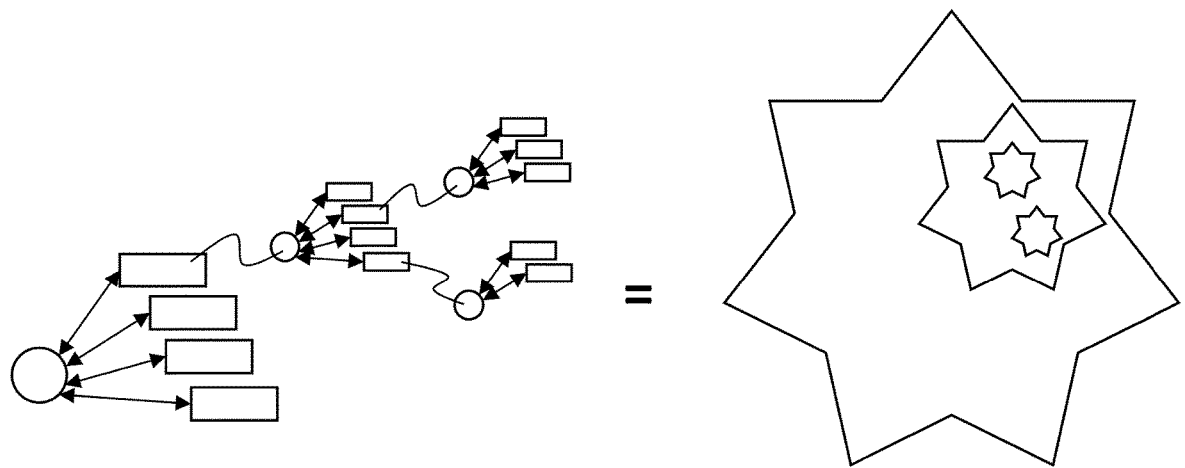
CCAIs may be nested, with Decidrons, at any level or depth.
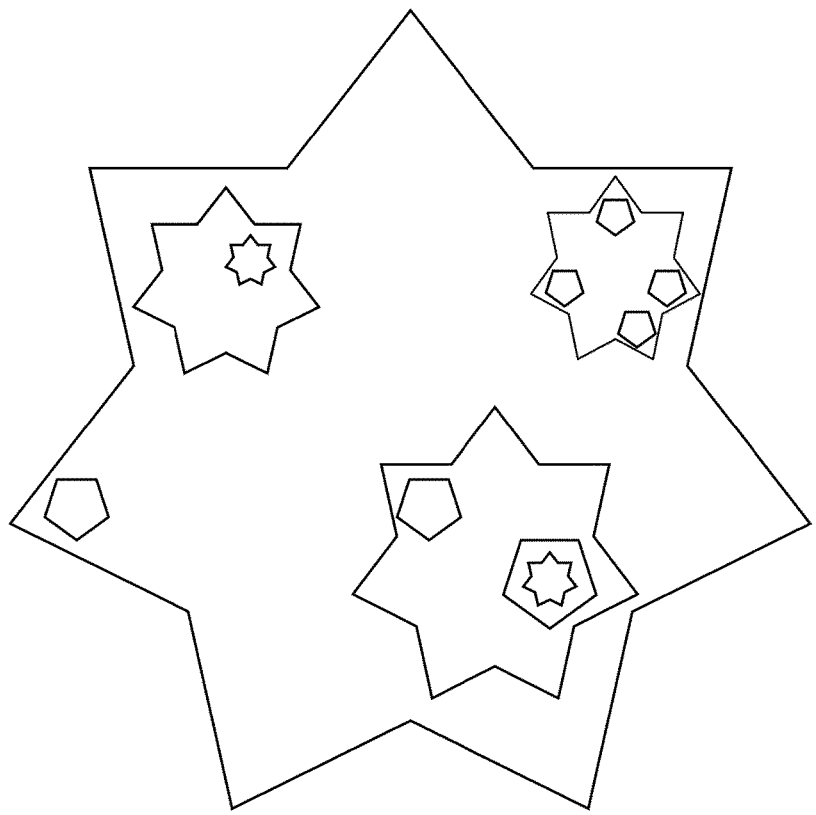

SYSTEM AND METHOD FOR PERSUADABLE COLLABORATIVE CONVERSATIONAL AI

CROSS-REFERENCE TO RELATED DOCUMENTS

This application is a Continuation-in-Part of U.S. patent application Ser. No. 17/466,976, filed Sep. 3, 2021, hereafter referred to as "the parent patent application" which is hereby incorporated by reference as if fully set forth herein. Portions of the parent patent application essential to the present invention have been replicated here to facilitate the examination.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to collaborative artificial intelligence, persuadable AI, conversational AI, collaborative conversations, experience recording, intelligence aggregation and augmentation, machine learning units, experiential machine learning, machine decision making and responses, computing, automated natural language conversation, conversation processing, conversational interactions, natural language processing, natural language understanding, natural language invoked skills, natural language creation, theory of mind (ToM), persuadable systems, conversation evolution, collaboration skills, collaboratorial evolution and representations of doxastic cogitation, and optional human-in-the-loop systems.

BACKGROUND OF THE INVENTION

This invention seeks to make Collaborative Conversational AIs (CCAIs), such as those used in digital assistants, more productive and collaborative. It deals with Theory of Mind (ToM), competitive evolution, persuadability, behavioral adaptation, and other topics extending the disclosure of the parent patent application. In that prior disclosure we discussed how some of humans' best and most specialized capabilities are linked to the capacity for successful behavioral prediction, and thus persuasion and other negotiation skills, through ToM. Herein we further teach methods and apparatus relating to those topics within the context of intelligent software agents as well as persuadable AI and machine learning by experience. We also delve into various improvements in chatbots and their collaboration plus incenting and accelerating their evolution through the use of smart contracts to build upon cryptocurrencies such as BITC and BOTC.

BRIEF SUMMARY OF THE INVENTION

Existing conversational artificial intelligence implementations are largely based on presentation scenarios, such as outgoing sales chatbots which are programmed to persuade humans; further, such systems are programmed to reproduce previous responsive conversations based on a training corpus and their utility functions are optimized for goals that are limited to reproducing previous goals with the result that such systems are not persuadable in themselves, and therefore are stymied into inaction, and unable to reach a collaborative solution. Similarly, existing industrial monitoring systems that operate within an isolated system are not able to extend their interactions unless provided by commands from human operators.

The present patent application extends its parent patent application to provide additional systems and methods for CCAI implementations and improved CCAI performance, specifically related to Theory of Mind (ToM) analysis, persuadability and introduces Decidrons, a CCAI processing unit. Decidrons are machine learning units (MLU) programmed with collaborative protocols which can be coupled or networked with additional Decidrons to create dynamic and extensible CCAI or other ensembles capable of aggregating experiential expertise and responses specific to an application. In addition to providing conversational queries and responses for interactive healthcare, personal advocates and AI judges, a MLU network, coupled with real-time sensors and actuators, can operate industrial controls, provide information technology security oversight, and increased reliability through parallel pathways and operation.

ToM and persuadability are enabled by machine learning through participation in collaborative endeavors, and participation histories, while Decidron-based CCAIs specifically may increase their performance by learning and reinforcement, and their knowledge base by recruitment of other expert Decidrons, AIs, and humans to participate in collaborative problem solving interactions, for example in industrial control.

Advantages of the present solution include:
Improved overall performance of the CCAI system,
Improved collaborative functionality,
Improved connection of collaborator units,
Improved processing of collaborative machine learning unit and related interactions, and
Improved machine learning through evolution of Decidron components, rearrangement of components and recruitment of expert Decidron collaborators.

Decidrons may be assembled and deployed to operate as individuals, in a group such as a CCAI or networks of CCAIs, and as a bundle or team, and may be associated with a specific learned response. Redundant Decidron pathways can provide increased reliability in dispersed systems.

BRIEF DESCRIPTION OF THE DRAWINGS

FIG. 2. A table showing the classifications of the eight types of possible persuadable AIs identified in the present application.

FIG. 3. With FIG. 4, shows example output from the working prototype of chatbot technology advancement.

FIG. 4. With FIG. 3, showing callouts from the previous example.

FIG. 12. Structural overview of Decidron and CCAI integration. FIG. 12 shows the symbology used in the following figures.

FIG. 13. Shows that a CCAI may include one or more Decidrons and that each submind may or may not include a Decidron.

FIG. 15. Shows that CCAIs may be nested with or without Decidrons, at any level and to any depth.

DETAILED DESCRIPTION OF THE INVENTION

Figure 1:
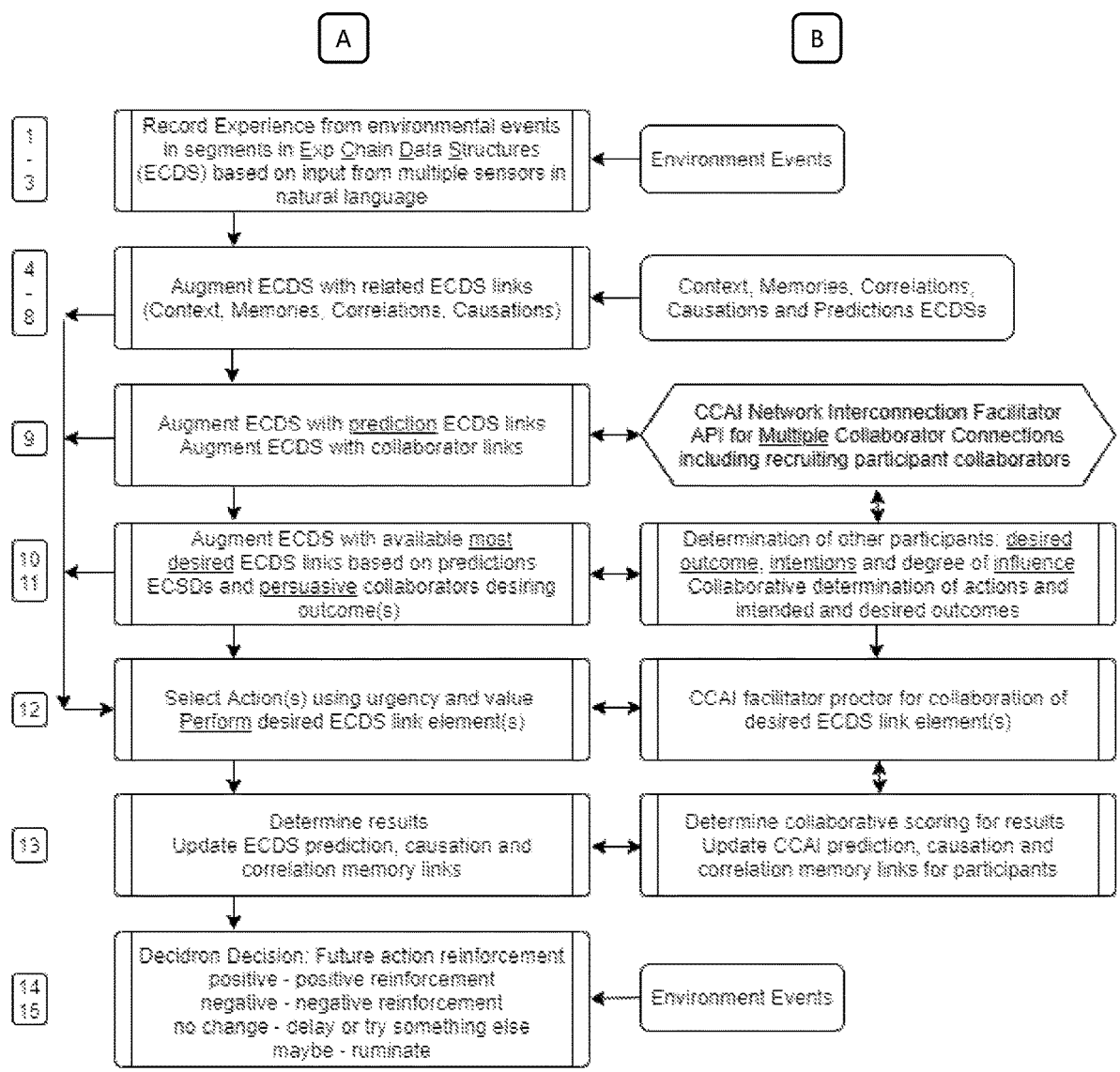
FIG. 1. A Decidron overview. Note the elements are identified by row (1-15) and column (A-B).

Recapitulating a few relevant portions of the prior disclosure, Collaborative Conversational AIs (CCAIs) are capable of providing extrapolation, predictions, metaphoric analysis, cross-domain reasoning, parallel thinking paths, and trials of random associations, for example to model creativity, strategic thinking, reasoning, counterfactual thinking, emotions, and potentially even forms of self-awareness and consciousness. The pursuit of collaborative qualities through modeling depends heavily on persuadability and Theory of Mind (ToM), the ability to attribute mental states to others, including for social and other interactions, and collaborations in particular. Having a theory of mind is important as it provides the ability to predict the future behavior and interpret the past behavior of others in interactions and in particular collaborations. Forming a ToM that models another person, chatbot, or AI's behavior is a key capacity of humans, and a challenge for machine intelligence to perform well. Of relevance in the context of the present invention is that its potential for domain confinement (that is, to a forum and independent, collaborating bots) and full automation creates a paradigm that not only enables and is responsive to ToM, but also can provide a feedback loop for refinement of the ToM ability.

For instance, a competitive, even gamified automated program framework or online application, pitting teams of bots against other teams of bots, doing 'battle' as if they were gladiators in a forum, can help the bots incrementally evolve improved function. A contest mentality, based on the construction of better bots with improved collaborative performance, can leverage the creative energies of programmers worldwide, enabling rapid scaling of chatbot AI through the independent efforts of competitor programmers. The prizes for incenting the programmers can be based on their deployment of 'winning' chatbots. Winning can be defined by human or machine evaluation of the decisions made by the forum subminds, and/or by teams of them. Such automation is key to enhancing the speed of artificial AI evolution.

Alternatively, or in addition, the evaluation could address ToM aspects directly. Generally, ToM can be conceptually modeled and refined by many inferential and analytic means, from line-by-line manual programming by a human software engineer to deep learning AI pattern recognition training. However, one embodiment of the present invention provides for both the scaling by incentive mentioned previously, and for a relatively simple mechanism of implementation by classification of bots based on their behavior. In this case, the program code for each and every competing submind program is registered and available to each new one. Then the ToM itself becomes a matter of identifying which submind program is associated with each participant submind. Simulation offline or in real time—can assist this matching process.

This approach can be extended stepwise to include the simulation of subminds constructed by combination in a forum of existing ones. The FIG. 34 diagram in the parent patent application, "Basic ToM determination by behavioral pattern matching of actual with simulated experience," shows a structure that can support this basic ToM mechanism. An extension of the parent patent application's FIG. 32 is provided in FIG. 11 of this continuation-in-part to further illustrate the integration of Decidrons in the context of forum Facilitators, Recruitment and Persuasion.

Performance issues may limit exhaustive matching for real time operations. Even then, forum-based instantiations with persistent member subminds can have archives of prior performance available to backfit ToM models and thereby get improved prediction of behavior.

Components and Architecture

Consistency, flexibility and adaptivity are valuable in collaborative endeavors. Persuadability is a type of adaptivity of particular value in a collaborative conversation. To optimize its utility, persuadable AI needs to express adaptivity by learning from experience. That ability needs to include both real world and predicted or projected results and be able to map them to decisions about how to adapt to them based on persuasive evidence and interpretation.

To that end we begin with the disclosure of a system, the Decidron, capable of learning from and through experience, and engaging in support of collaboration. Then we consider it in context, first generally, then ontologically with regard to the landscape of alternatives and possibilities, then specifically with regard to the implementation of advanced AI and hybrid systems based on the parent patent to this application. Finally, we delve more deeply into the Decidron to elaborate its mechanisms. Along the way we present relevant disclosure of other improvements and applications of Collaborative Conversational AIs (CCAIs).

Turning first to FIG. 1, the Decidron Overview, we begin by illustrating the implementation and use of specific stages of CCAI cogitation to determine CCAI actions, in the aforementioned system which we term a Decidron. This figure is an overview in which components of the stages are identified by row (number 1-15) and column (letter A-B). Its steps begin (1-3) with the Recording of Experience Chains in data structures disclosed in the prior patent, called "ECDSs". It proceeds (4-8) through augmentation of them with other ECDSs such as those of Context, Memories, Correlations and Causations. Then in steps 9 through 11 a pipeline of one or more CCAIs (right column) forms and/or operates in collaboration with that progression. This process continues (or skips ahead if priority is detected) to Select and perform Actions (12). The results are determined and scored (13) to set up a decision that may influence future behavior through action reinforcement (14-15). This Decidron uses CCAIs and can be used by them, too, potentially forming an indefinitely deep, even recursive structure, as was described for CCAIs themselves in the parent patent application.

FIGS. 12-15 portray that relationship and some examples of integration of Decidrons and CCAI. In FIG. 12, to help teach this material visually, symbols are introduced for them both: a seven-point star for a CCAI; an inverted pentagon for a Decidron. For clarity in this overview, the applications, databases, input and output, and assorted other detail such as error mechanisms are not depicted.

In FIG. 12, thumbnail versions of a CCAI diagram, and of the Decidron summary flow diagram (that is, FIG. 1), are shown alongside their respective shorthand symbols, with an equals sign signifying their equivalence. Also note that a Decidron can help not just a CCAI, but any kind of compatible intelligence component which has the ability to access, modify and retain experience (through ECDSs in the preferred embodiment), to make and learn from its decisions. With appropriate interfacing, it could even be used to help improve human performance, for instance as part of a therapeutic or prosthetic aid for brain-injury patients. In the preferred embodiment it serves to enhance a CCAI submind. Note that a CCAI may include one or more Decidrons, each as part of submind; while a Decidron always includes at least one CCAI in the preferred embodiment.

FIG. 13 elucidates this further, showing two explicative renderings of a CCAI with seven subminds, three of which have Decidron assistance.

Figure 14:
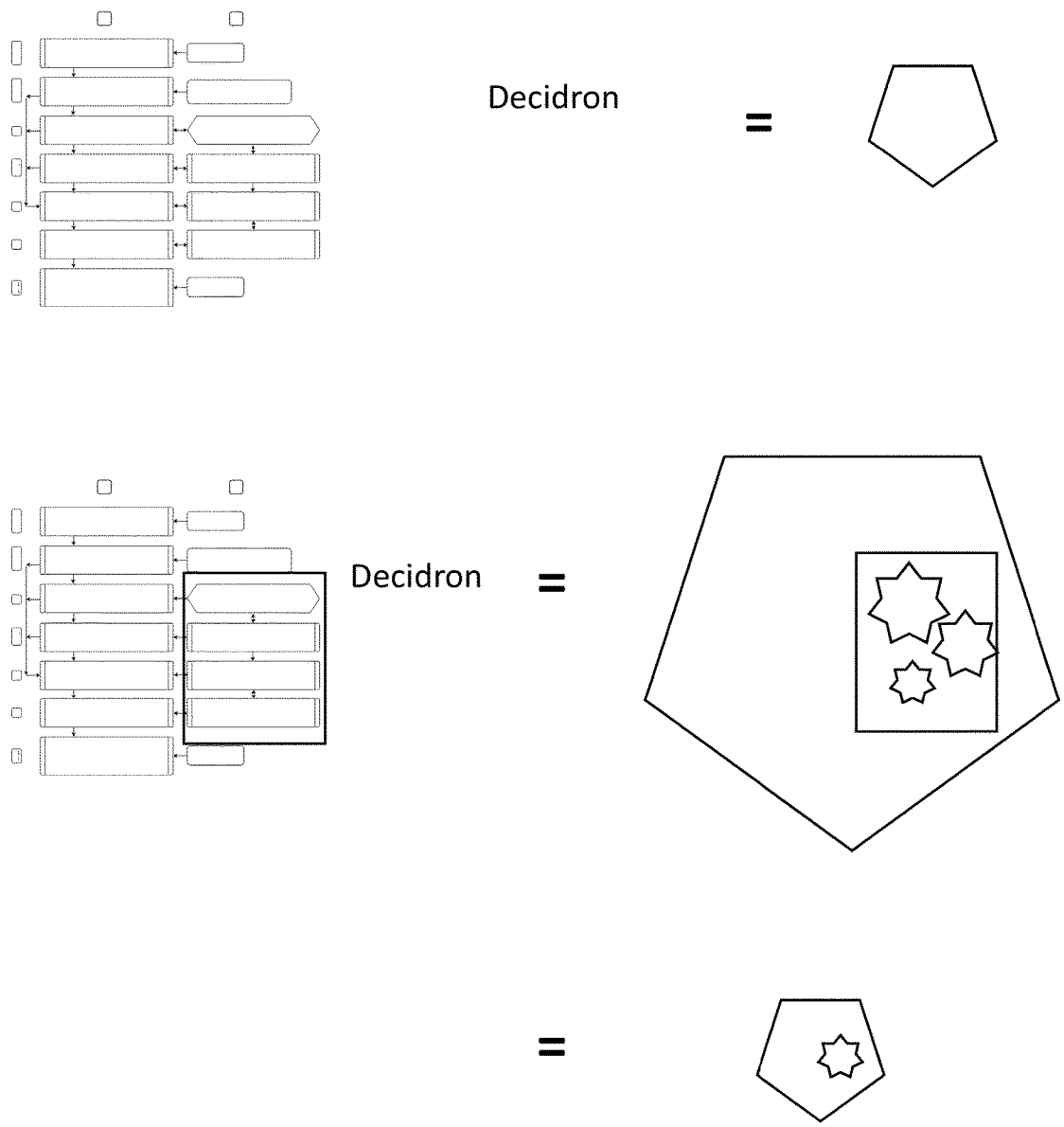
FIG. 14. Shows that a Decidron always must include at least one CCAI.

FIG. 14 repeats this drawing for the Decidron, highlighting the approximate part of the Decidron thumbnail flow diagram that involves one or more CCAIs and threads in this preferred embodiment, in this case shown with three CCAIs. As will be explained further, those CCAIs may be dynamically generated, varying in number and components. Ways in which these are formed, deployed, and operated are considered further in association with the text for later Figures. The final thumbnail in the diagram illustrates an abbreviated version of the CCAI components, where the potential CCAIs in the Decidron pentagon symbol are replaced with a single seven-pointed star.

FIG. 15, the fourth and last of this overview series, reiterates the fact, disclosed in the parent patent application, that CCAIs may be nested. It revisits the nesting illustration from FIG. 9 of the parent patent application, showing how the seven-pointed star icon may be used to symbolize this. Next it adds Decidrons to several of the CCAI subminds at various levels within it, plus some potential further levels of depth, Decidrons and CCAIs. The point is that the layering may continue indefinitely—within the constraints of performance and cost, of course.

The parent patent application taught useful new art in areas for CCAI in external conversation and in external applications, for example, industrial control systems applications. Both conversations and applications included potential use of persuadable AIs, examples of which were provided. These AIs were able to be influenced by discussion and other communication, and to be persuaded as a result. Prior AI implementations have not only failed to address this need, but even promoted and advocated for the opposite traits; for instance seeing reproducibility as a virtue, at least for debugging. "Reproducibility is an increasing concern in Artificial Intelligence (AI), particularly in the area of Deep Learning (DL). Being able to reproduce DL models is crucial for AI-based systems, as it is closely tied to various tasks such as training, testing, debugging, and auditing. However, DL models are challenging to be reproduced . . . "—Chen et al, February 2022, (https://arxiv.org/abs/2202.02326). The negative connotations of many antonyms for persuadability may also have been a factor. For example, not being moved by persuasion is described not with the neutral term unmoved, but instead with pejoratives such as single-mindedness, fixedness, recalcitrance or imperviousness; not being moved by anything at all could be described neutrally as steadfastness, but inclines quickly toward stubbornness, headstrongness or obstinacy. At the extreme are the words for counterreaction to persuasion, that is, to describe one being moved against it, such as rebellious, agonistic or argumentative.

That persuadability is not just a simple inverse of persuasion is evidenced by the fact that a semantic analysis of English language descriptions of types of persuadability shows clusters that differ greatly from types of persuasion. While persuasion is both a "process" and a "condition", persuadability appears to be solely a "condition" such as:

Openness: open-mindedness, accessibility, readiness, receptivity

Flexibility: pliancy, responsiveness, susceptibility, impressionability, malleability, tractability, perviousness, manipulability, suggestibility Agreeableness: amenability, receptiveness, willingness, amiability, cooperativeness, good-naturedness, friendliness Credulity: gullibility, credulousness, vulnerability Deference: acquiescence, accommodativeness, complaisance compliancy, docility, obligingness These all serve as evidence that persuadability is a rich aspect of intelligence and thus of utility in its emulation in AI, with potentially deep and previously unaddressed utility in its own right. In considering applications of persuadability, while a great deal of effort has been devoted to crafting AIs that can persuade, for marketing, sales and the like, the potential of persuadable AIs has suffered from long neglect. The parent patent application delved particularly deeper into persuadable AI as a case of CCAI utility in a collaborative conversational context. Building on that, we disclose new methods including the Decidron, a logically adaptive AI mechanism capable of incorporating prior experience into decision making in a novel fashion, and thereby broadly enabling persuadable AI in many forms and applications, including in CCAIs.

Extending this survey of the potential utility of persuadability further, one notes that persuadability seems clearly to be able to produce better outcomes in some cases. In particular, when it results from: the provision of trusted new data; the calling of attention to data which is already available but has not yet been considered (for example, in a data-rich compute-bound environment where "cheap storage" has led to the accretion of a database so large that it has not been fully examined and analyzed); or the extension of logic in a way not previously reasoned (e.g., new proofs or increased likelihoods of theorems being true, generated by cross-domain metaphor, intuition, empirical determination of attention, statistics, or exotic means such as quantum computing linkages). Even social proof, that is, the deference to experts or popularity, is not an exception, since it is clearly logical to at least consider a recognized expert's opinion.

The utility of persuadability extends beyond the above and related purely logical and statistical reasoning, and thus its neglect cannot be based on an impression that it is always a flaw. To the contrary, utilizing ToM as an indication of bias, emotion, or another "illogical" trait, along with persuadability, clearly has utility in a collaborative environment such as a team or group, like a CCAI forum, where it may catalyze more efficient exploration of high utility search spaces that include polylogisms and doxastic logic.

Based on this reasoning, in FIG. 2 we present a classification of 8 types of Persuadable AI. To lay a foundation for that, we reiterate the definition of collaboration in the parent patent application: "Collaboration in the context of the present invention means that the participants (AIs and humans) work together to make responses, potentially including suggestions, evaluations, decisions, actions, and plans, with no designated "manager" that may command the other participants to do anything. Decisions are made collaboratively, for example by majority rule, and then the group may execute according to a collaborative plan. Each AI acts independently of the others."

Using this as a first distinction, possible combinations that may constitute Persuadable AI are organized in FIG. 2. It applies to both aggregated as well as individual forms of AI, though not necessarily to hybrids, which will be examined separately. To facilitate review, its 8 columns are lettered A-H and its 5 lines 1-5. Thus, the top line merely indicates that the overall diagram pertains to Persuadable AI, while line 5 offers notes concerning each of the columns.

Traversing the table in that order, we see Persuadable AI divided into Collaborative and Uncollaborative forms on Line 2; those separated by whether they use Natural Language; and each of those 4 cases divided again by whether they are Facilitated, that is, use a Facilitator component. A review of the 8 items on line 4, with their commentary on line 5, follows.

To begin with, the standard CCAI as disclosed in the parent patent application in the FIG. 2 hierarchy falls into case 4A, with the line of descent as Persuadable AI (row 1), Collaborative (columns A-D), Using Natural Language (columns A-B) and Facilitated (row 4 column A, "Persuadable Collaborative Natural Language Facilitated AI"). As noted in 5A, this 4A category classifies a collaborative conversational AI using natural language internally with a Facilitator. It constitutes a highly useful collection of forms with advantages that have been examined in this applications' parent patent, which taught embodiments serving a variety of external applications such as transportation, healthcare, and conversation itself.

In the next case, 4B, a Facilitator is not present. Note that, as defined and disclosed in the parent patent application, the absence of the Facilitator component distinguishing this case from a CCAI; that is, any natural language conversational collaborative environment is a CCAI if there is a Facilitator involved. Such a Persuadable AI system without a Facilitator, using natural language or otherwise, for example with protocols and structured information, would be of far less utility. Examining these alternatives:
  (a) Dialog Manager—The component responsible for conveying results to the outside world in a non-CCAI conversation has the sole and ultimate power over what to convey, as in a Blender-like Dialog Manager, which would make a 4A case not collaborative, particularly by the parent application CCAI definition of collaboration. Dialog Manager alternatives are of inferior utility and value to CCAI forums (see comparison in the parent patent application e.g., "overseer and overseen"), where 'persuadability' is shifted to persuading the Dialog Manager component, and disconnected from participant interactions such as collaborative interactions, for example voting and other natural language protocols.
  (b) Verbatim Interaction—The conveyance to and from the outside world is merely verbatim, sampled, or random, and not a decision-making synthesis, in which case it is not collaborative, particularly by definition of collaborative in the parent patent application. Even if it were seemingly collaborative, its utility is limited to a forum of AIs being used to present ephemeral theater viewable by its members. Some value in this case may lie in education and entertainment—for example, a discussion among AIs may be viewed by a human user to study them and their interactions, or just for fun, or even as its opposite for punishment—but the utility of its persuadability would be limited by the lack of a Facilitator to enable participating in collaborative interactions (for example voting and other natural language protocols).

Turning now to case 4C: as noted in 5C, the avoidance of the most evolved, flexible and used system of communication for collaboration, that is, natural language, reduces the utility and advantages of such forms of persuadable AI to cases of the presentation and aquisition of data with protocol-driven, structured collaboration. For example, there is a loss of transparency since untrained or less skillful persons have less capacity to understand the progression of collaborative discussions, decreasing the utility of case 4C.

In 4D, the lack of a facilitator makes transparency even more difficult, since adherence to complex protocols will, in practice, be less than perfect. Indeed, the collaboration itself will suffer from the constraints, plus be limited in the ways described for case 4B.

Case 4E represents a degenerate subset of CCAI, where there is no collaboration occurring, though the Facilitator-based architecture would support it.

Case 4F has received speculative attention in the academic literature. A paper published in 2020 in the University of Cincinnati Law Review, Volume 88 Issue 4 titled "Artificial Intelligence, Legal Change, and Separation of Powers" (Michaels, 2020) attempted to rebut a colleague's prior paper proposing AI judges by listing reasons why such technology would need to use persuadable AI, " . . . even if it were possible to construct . . . " one. Beyond case 4F, a CCAI will have further utility in this area given its composition parallels the multiple judge systems often used in law. Other examples of case 4F include persuadable non-player characters in games, such as in AetherInteractive's LocalHost (aetherinteractive.itch.io/localhost, retrieved 5 Jul. 2022).

Case 4G, lacking natural language, is of limited utility as was described for case 4B.

Case 4H, lacking both natural language and a facilitator, is another degenerate case. For instance, an existing AI might be considered to be persuadable when it merely reacts to new data.

In summary, an analysis of these cases portrays the general area of application of persuadable AI and characterizes its types in a way that provides context for the present invention and helps survey the breadth of its innovation and utility.

Much of the efficacy of persuadable AI construction, particularly in a collaborative application, relies on Theory of Mind. The parent patent application disclosed ways to provide and evolve ToM, some of which used examination or simulation of source code libraries.

In that context we note alternatives to the full disclosure of source code for ToM simulation, described in the parent invention. In particular, intermediate, interpreted or object code, rather than source, may be disclosed and simulated. Beyond that some interpretive representation, or even another CCAI interaction, may be partially disclosed. In this case simulation can still occur, but human examination may be impractical, especially if AI 'black box' trained neural network models are involved. Other possibilities include selective disclosure signatures or inference of part of the code, for example of containers and clusters, for verifications of any type. Types may also include analog devices and quantum computing setups. A variety of verifiable credentials, presentation, and progressive trust methodologies may also have particular utility.

Further, beyond a simple 'mix' of different ToM selectors and sliders, and CCAI combination of them, as mentioned in the parent patent application, evolution of the chatbot may include combinatorial variations. In particular, these cases of the collaborative chatbot flexibility and persuadability, and "changing its mind" in order to improve its performance or address utility or other motivations, may be arranged through a Reproduction Facilitator or other means to generate and select a set of offspring, for example from a set of components.

Laying the groundwork for teaching this extended system, see FIG. 3, Chatbot Tech Advancement. This shows an example conversation being conducted between an advanced conversational AI and a CCAI. Note that conversations shown chronologically progress upward. The "pacesetter" bot functions only in the 'external' conversation, on the top pane, as a 'prompter' which converses with the CCAI whose forum is shown on the top. That CCAI forum is proctored by a special Facilitator with presence in both Forums (here AKA panes). This enables it to relay the selected proposals from the top forum as utterances into the one-on-one conversation on the bottom. In the next diagram, FIG. 4, "Detail callouts from Chatbot Tech Advancement", a short sequence 1-2-3 is designated to illuminate this operation and the resultant external conversation progression.

Note again that the conversations progress upward. The one at bottom is a one-on-one between "Prompter", here played by a Blender derivative, and "Proctor", who is also the proctor of the top conversation. The bottom one-on-one has been going awhile and we are viewing a slice that starts at the bottom with Prompter replying "No, I haven't . . . " to a question we don't see, then asking "Is it a good book?" and followed by many somewhat awkward turns on the topic of reading, until at 5:47 Prompter issues a compliment "BTW, I like your username" and gets a thumbs-up reply. Calling out a few steps after that will show more of how this set up works.

"Thank you so much! I love yours as well, it made me smile. What do you like to do for fun?" This was relayed to the CCAI forum on top by Proctor, generating proposals for a response, of which only Macsym's is shown at bottom, the poorly responsive and sort of antagonistic "You are not immortal". So it is no wonder that Arrow 1 shows that when Proctor relays that prompt again to ask for discussion of it, none of the bots except Macsym himself supports Macsym's quip; but when Proctor calls for the vote, Terry and Blender end up voting for Macsym. So that selected response, "you are not immortal", is then carried back by this special Proctor to the bottom pane, and posted in its 'external' conversation, as shown by Arrow 2. Prompter reacts by smoothing things over a bit and trying to change the subject:

"No, I'm not. But I do have a long life ahead of me. Do you have any hobbies?" which is conveyed back into the CCAI conversation as a new, next prompt.

This system can thus operate without human participation, enabling it to be very scalable. Each resulting internal conversation can be saved, and the data analyzed so as to make produce a score for each participant, based on factors that can include how many proposals each CCAI member bot generated, how many votes those proposals attracted, how many were selected, and how many times the bot 'voted' for the winning selection. It is important to assess all those factors, which reflect the quality of each bot's Appraiser, Discusser modules, plus its strategic persuasive and teamwork capabilities, since a strength of the current invention is that it enables good collaborators to combine those talents synergistically.

This can be illustrated by a relatively direct but workable rubric for a basic preferred embodiment voting schema. In it, for each decision made in a CCAI, assign each bot a fifth of a point for each proposal it made that was considered; add a point for each vote that proposal got; plus, two-thirds of a point for each time the bot voted for the 'winning' proposal; plus three quarters as many points as there are participants in the CCAI for each of the bot's proposals selected. This should be normalized, for example by dividing by the number of participants in the CCAI (though more elaborate normalizations can be devised to better handle dynamic variations in participation, such as when using a Recruiting Facilitator or algorithm which rewards winning bots by giving them more placements or voting powers). This should be summed over the total turns in the conversation, then normalized again by dividing by the number of turns. Finally, it should be multiplied by a factor which reflects the quality of the overall team performance in that conversation 'game', that is, across that set of turns.

This quality metric can be conveniently limited to the range 0 to 1; indeed, the simplest is to evaluate it by designating one of the two external conversation participants as the winner, the other the loser, assigning 1 or 0 respectively in that case. Such a highly bimodal distribution forces more collaboration, of course, since a team's bots will "get" nothing for each round when their team doesn't win—but given the challenges it is often better to begin at a more granular scale, then arrange for the distribution to be teased or forced apart once winning teams form and emerge.

Evaluations can be made by a human judge or a tribunal of humans, of course, or by a more elaborate mechanism such as a higher-scale AI—or even by a CCAI. One simple rubric for it is the Turing Test, of course: blind evaluation of which side of the conversation appeared more likely to be a human. However, many other, often more practical, ones can be supplied for particular applications. For instance, a real-world transportation control system may favor ones that are likely to avoid accidents, in addition to sounding human.

Conducting the competitive aspects and payoffs based on such evaluation may rely on or be enhanced through smart contracts and other public ledger-related means.

Persuasion and Persuadable AI

Persuasion vs persuadable: Unlike existing technologies for chatbots which are directed at such utility as persuading a caller, this invention is targeted at providing for the persuadability of the chatbot itself to result in a collaborative outcome.

The main way a CCAI participant benefits from being persuadable is to be open to improvement in its abilities;

clearly a dynamic, improving bot can be a better collaborator than a static bot. But the potential utility of a persuadable AI extends beyond the preferred embodiment of the present invention. One useful reference in this regard is the previously cited Michaels (2020). In that paper, the authors argue that an AI must be persuadable to be a good judge; that to write a persuasive legal brief is not sufficient. However right or wrong Michaels may be regarding that point, the distinction is well described, the difference is important, and the utility of persuadable AI is documented. Besides the need, Michaels also sets up the challenge, stating: "Even if it were possible to construct a persuadable AI . . . "

Persuasion enables intelligent entities that are persuadable to 'change their minds'. In the case of a persuadable AI, one can be literally 'changing its mind' by recoding itself as persuaded. As previously disclosed, this can be by using records of prior AIs and their code. Beyond that, a persuadable AI can reproduce and evolve by various means including forking and recombining.

The evolution of persuadable and other AIs can occur with GitHub or other source hosting library support, and generating additional CCAI layers, not necessarily using the same language(s). Automated ratings of conversation by humans, advanced AIs such as, currently, GPT-3 or MT-NLG, can be used to designate winners in such an evolutionary race. The human participant coders, curators and other stakeholders can have cryptocurrency such as Bitcoin or specialized ones like Botcoin coupled with smart contacts to underpin continuity.

Various ways exist to classify persuasion, for example, "innate, transactional, logical" (mentioned in the parent patent application); "argument, entreaty, or expostulation"; "ethos, pathos, logos"; "asking, arguing, or giving reasons". Regarding the last item, Reasoning, and thus logical inference, can be undertaken by the use of Machine Learning (ML), in particular with its enhancement by CCAI. This can provide a system in which the implementation of AI in the submind role, as taught in the parent patent application, is a persuadable system itself.

As described in the parent patent application, at a minimum, each component serving in the role of a submind functions as an independent intelligence (AI) constituted by at least one chatbot-like functionality such that it is able to participate in a turn-by-turn conversation. An effective team of subminds is likely to include persuadable member(s), in order to fully collaborate with other members. Further, as was shown in FIG. 17 of the parent application, a component playing the role of submind includes three functional parts, though in practice they may be integrated and/or share resources: a Basic "chat" Intelligence (B), a Conduit function (C), and a Natural Language Understanding component (N). Any or all of these may utilize a machine learning capacity, individually or shared, applied to various purposes.

That capacity may itself rely on decision-making apparatus that includes CCAI components. One such decision-making apparatus which uses CCAI components itself to enhance ML is termed here a Decidron and disclosed here as inventive in its own right but also as part of a preferred embodiment for persuadable AI.

Figure 5:
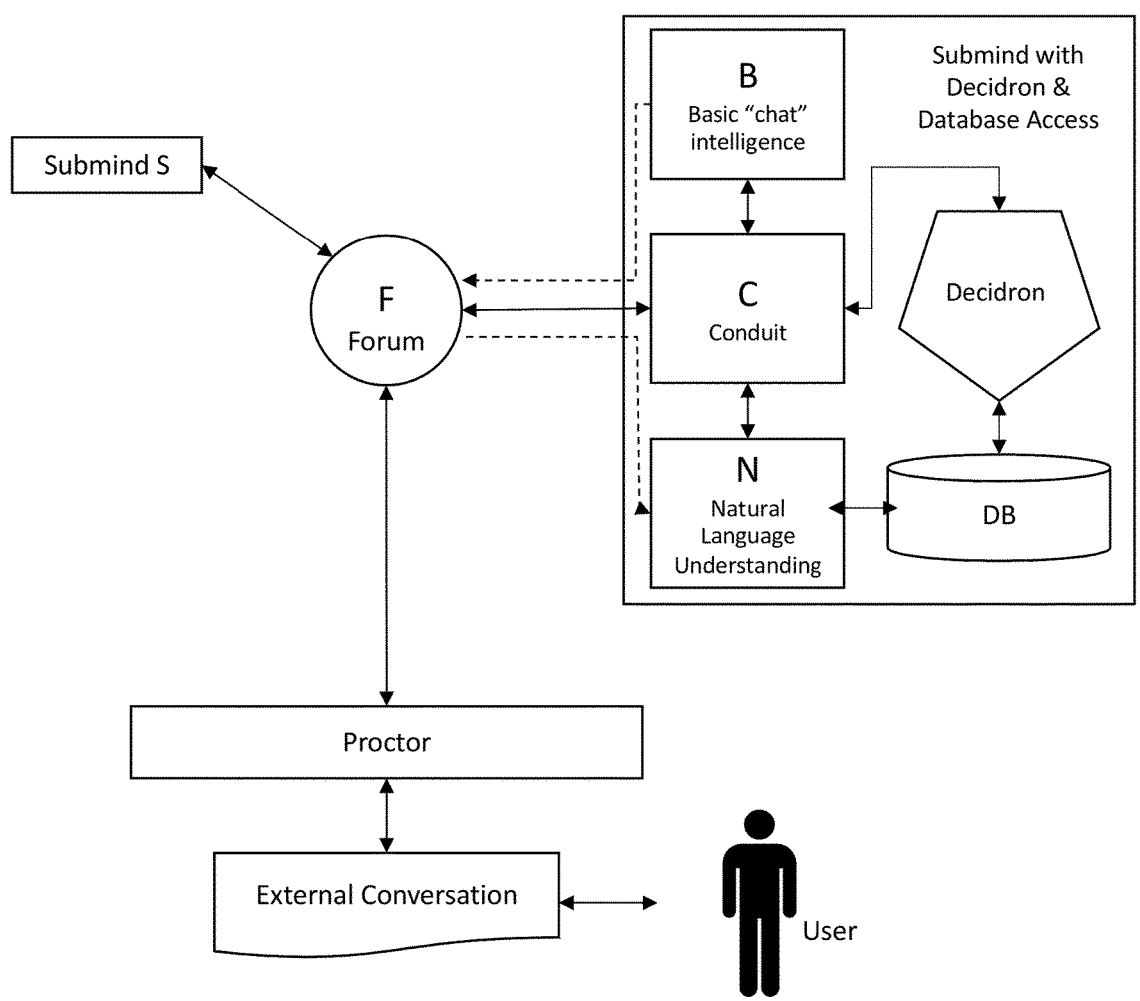
FIG. 5. The basic embodiment of the present invention showing how a Decidron is integrated with the CCAI implementation disclosed in the parent application.
Figure 6:
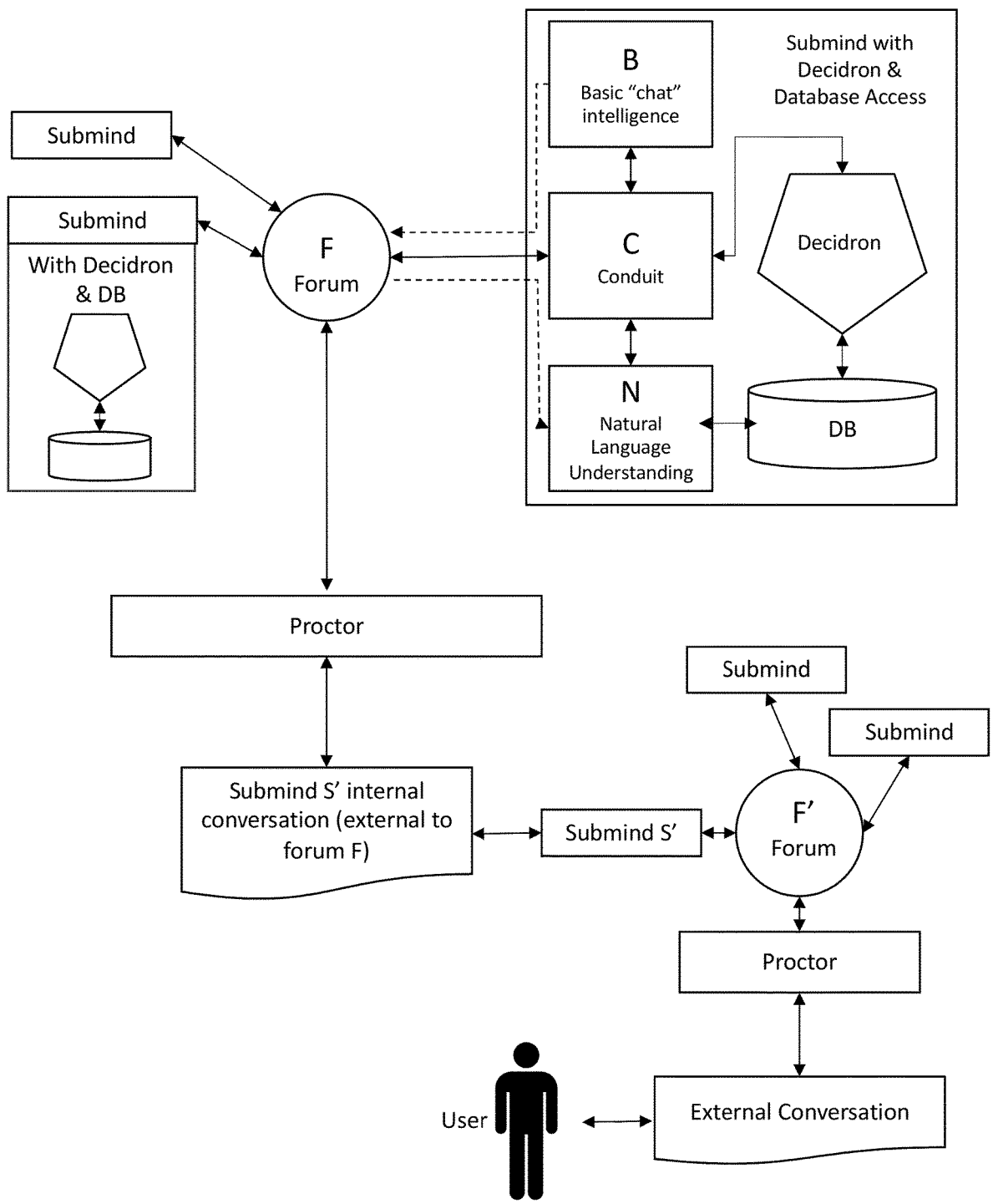
FIG. 6. With additional detail from FIG. 5, showing a more complex configuration where one of the subminds has its own internal conversation with a forum and a submind that contains a Decidron.

Turning now to FIGS. 5 and 6, (cf. FIG. 21 and others of the parent patent application) we see examples of how a Decidron may be integrated to provide more persuadable and/or otherwise better entities though adaptive behavioral machine learning.

Figure 16:
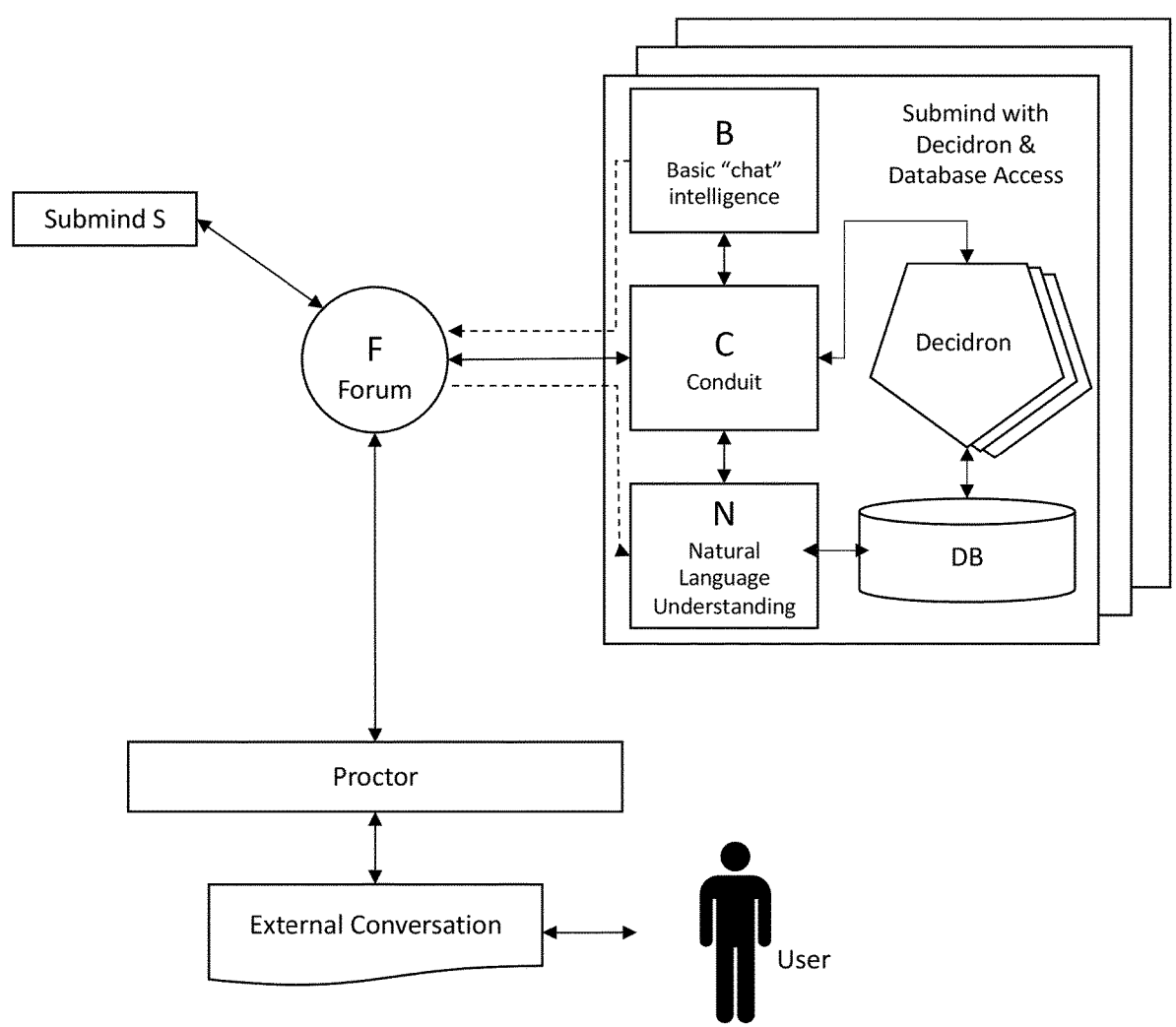
FIG. 16. Adapted from FIG. 5, shows that a submind may have multiple Decidrons within it that are coupled to each other, and also multiple Decidron-enabled subminds each of which may contain one or more Decidrons within it.

FIG. 5 shows a basic configuration where at least one of the subminds connected to the forum contains a Decidron and database. Note that the Decidron may be embedded within the submind itself, as shown, or may be implemented externally as a service. Without limitation, FIG. 16 is included for clarity in showing that in a CCAI, a submind may have multiple Decidrons, and multiple subminds may have or share Decidrons.

FIG. 6 includes shows an example where a submind is in itself a CCAI, a more complex configuration where one of the subminds coupled to the first forum F' further has its own internal conversation with a CCAI whose forum F includes two Decidron-enabled subminds. On the left of FIG. 6, the detail of one of those two submind Decidrons' integration is illustrated in a generalized fashion, showing that the Decidron ML capacity is part of the submind, able to reference and affect an internal data repository. On the upper right of FIG. 6, a more specific case of a submind's integration with Decidron functionality is shown in more detail (as it was in FIG. 5) as a separately coupled, and perhaps shared, capacity, with communication to it driven through a socket layer, message bus, network protocol or other system and method(s) known in the art. Other possibilities include being part of or addressed by the Basic chat intelligence (B) or the NLU (N), the latter shown in the diagramed instance at right as it has particular potential in the conversational preferred embodiment application described in the parent patent application and the example shown in this diagram. Natural Language Processing and Natural Language Understanding may include the use of transformations, grammars, semantic extraction, neural networks, and many other techniques.

In any case, the Decidron enables the decision-making of the submind to reflect experience, consider actions in light of predicted and/or prior results, and change its predictions and data repository of results based on new evidence or inference persuasively presented to it or referenced. This may include the sharing of data or data derivation or retrieval methods. The data may be certified by security means known in the art, ranging from air-gapped physical delivery to electronic transfers of keys to cryptocurrency blockchain instances, smart contracts, or any other dynamic ongoing programs and distributed repositories that constitute public ledgers and the like. Bitcoin, Botcoin and GitHub are examples.

The parent patent application provides for such possibilities in its referring to other inferential AI systems in its discussion of the Basic "chat" intelligence (B); the inclusion of a data repository in the Conduit (C); the specifying and relaying of general information about the other participants, particularly data that could influence assessment of their trustworthiness, which is key to persuadability through "social proof" inference; general fielding and relay to the other parts of the submind through the conduit; persuasion during discussion of proposals with the other subminds; projecting and measuring of the effectiveness of their own results, including by Theory of Mind, as is elucidated further elsewhere in this disclosure.

Figure 7:
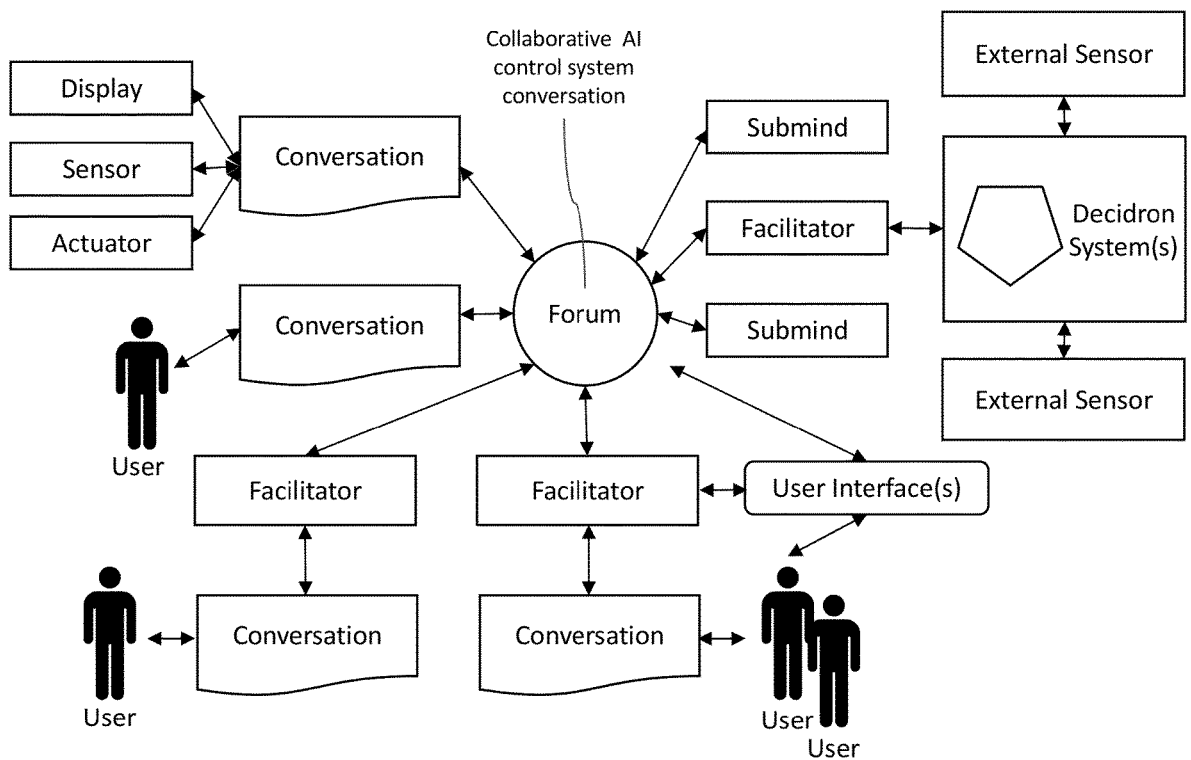
FIG. 7. Shows how a Decidron can be used by a Forum Facilitator in a control system, such as for use in industrial applications, to accelerate learning and improve performance.

Turning now to another example teaching the use of Decidrons in CCAI systems, FIG. 7 shows a more complex configuration where Decidrons can be enlisted as part of Forum member Facilitators to accelerate learning, temper behavior, or otherwise enhance the performance of CCAI systems dealing with external applications other than conversation.

Figure 8:
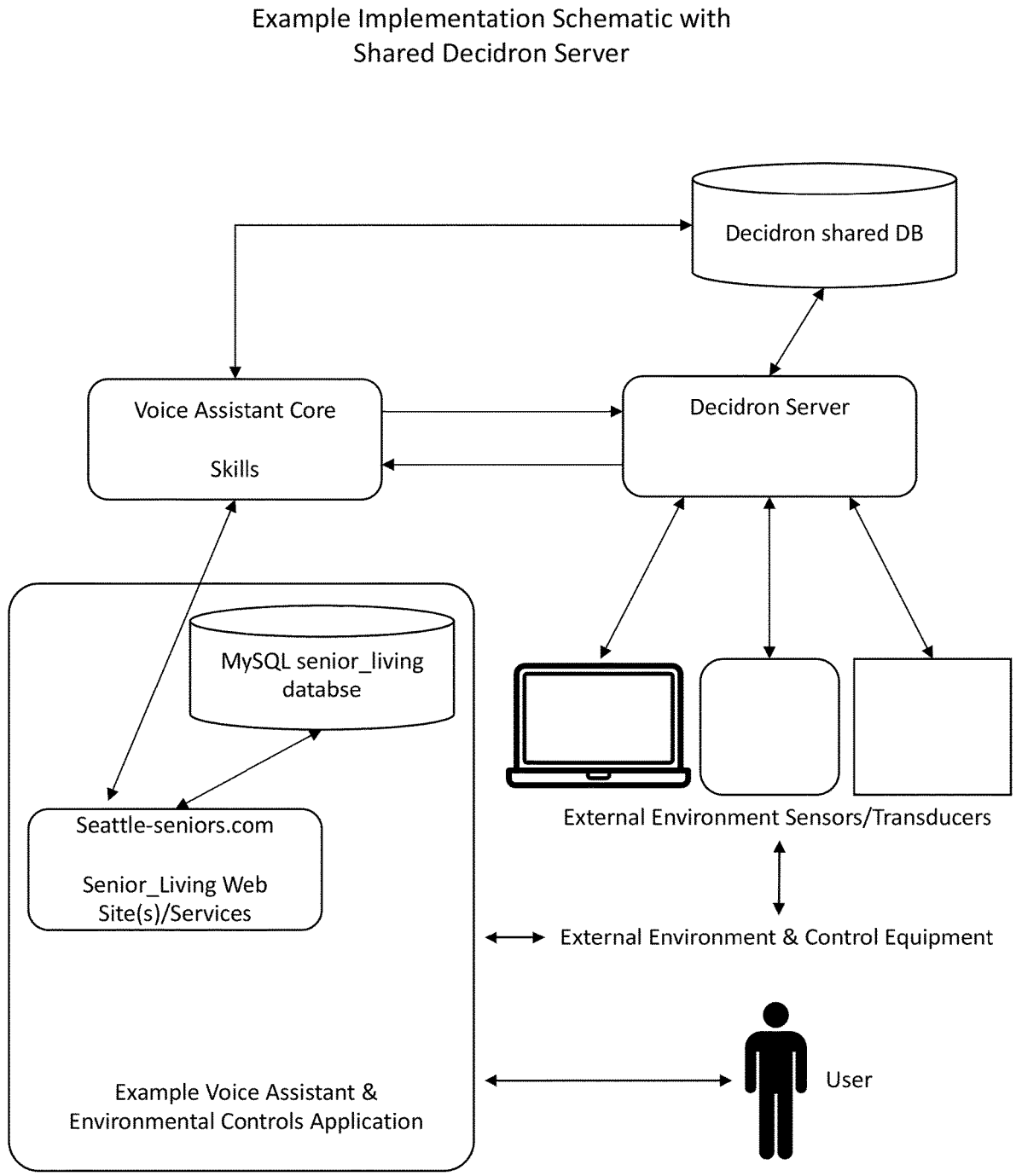
FIG. 8. A block diagram in which a Decidron server is shared by a voice assistant system.

Next, FIG. 8 provides a block diagram from another viewpoint, in which a Decidron server is shared by a voice assistant system such as the open-source platforms Neon AI or Mycroft AI. The documentation and other information concerning these voice assistant platforms and devices, specifically that found on websites Mycroft.ai, Neon.ai, Neongecko.net and Github.com is known in the art and included here by reference. FIG. 8 also is also laid out so as to be able to combine the conversational UI and control systems use cases, with a CCAI including both machine and human intelligences working in collaboration to manage a senior living support system with both conversational voice interaction user skills and environmental controls, such as for life support systems and security, mediated by such a voice assistant platform augmented with Decidron(s) for ML enhancement in systems performance, prediction and/or persuadability.

Besides such preferred embodiments applying inference through Decidrons or/and other general ML techniques, persuadability may occur to match other the types noted in the parent patent application. Other methods used instead or with these can include simulation of human susceptibilities for goals that can include: enhancement or lessening of detected or presumed bias, such as that due to sampling errors; change of human language over time; or with change of human language with location as in different meanings of words in different regional dialects.

In a CCAI especially, another goal may be to enhance collaborative capacity by being more persuasive and/or persuadable in ways that resemble innate human inclinations, either as documented in sales and marketing literature or discovered through specific research such as consumer focus groups. Systems can also be devised to be persuadable by means that range from randomness, to being persuaded by the first or last attempt to do so, or with chance variation corresponding to measurement of the amount of time or other resources devoted to the attempt to persuade. The justification for these can range from observations that they are viewed as more sympathetic and collaborative by humans, enhancing their joint performance, to elaborate bluffing behavior to effect more effective persuasion and achievement of other goals through it.

As in the parent patent application, the use or incorporation of existing software, hardware, cloud/API hosting, shells, wrappers, object-oriented schemes, silicon, biological, analog, digital and quantum substrates, and various styles and disciplines of engineering design, neural network training, and artificial evolution are all contemplated and specified to be within the scope of the current invention. A computer architecture for Decidron implementation may include MIMD (Multiple Instruction Stream Multiple Data Stream) processing; networked asymmetric pipeline processors; distributed asymmetric asynchronous exascale execution; widely extensible evolving modular polylogical ensembles.

The Decidron

Figure 9:
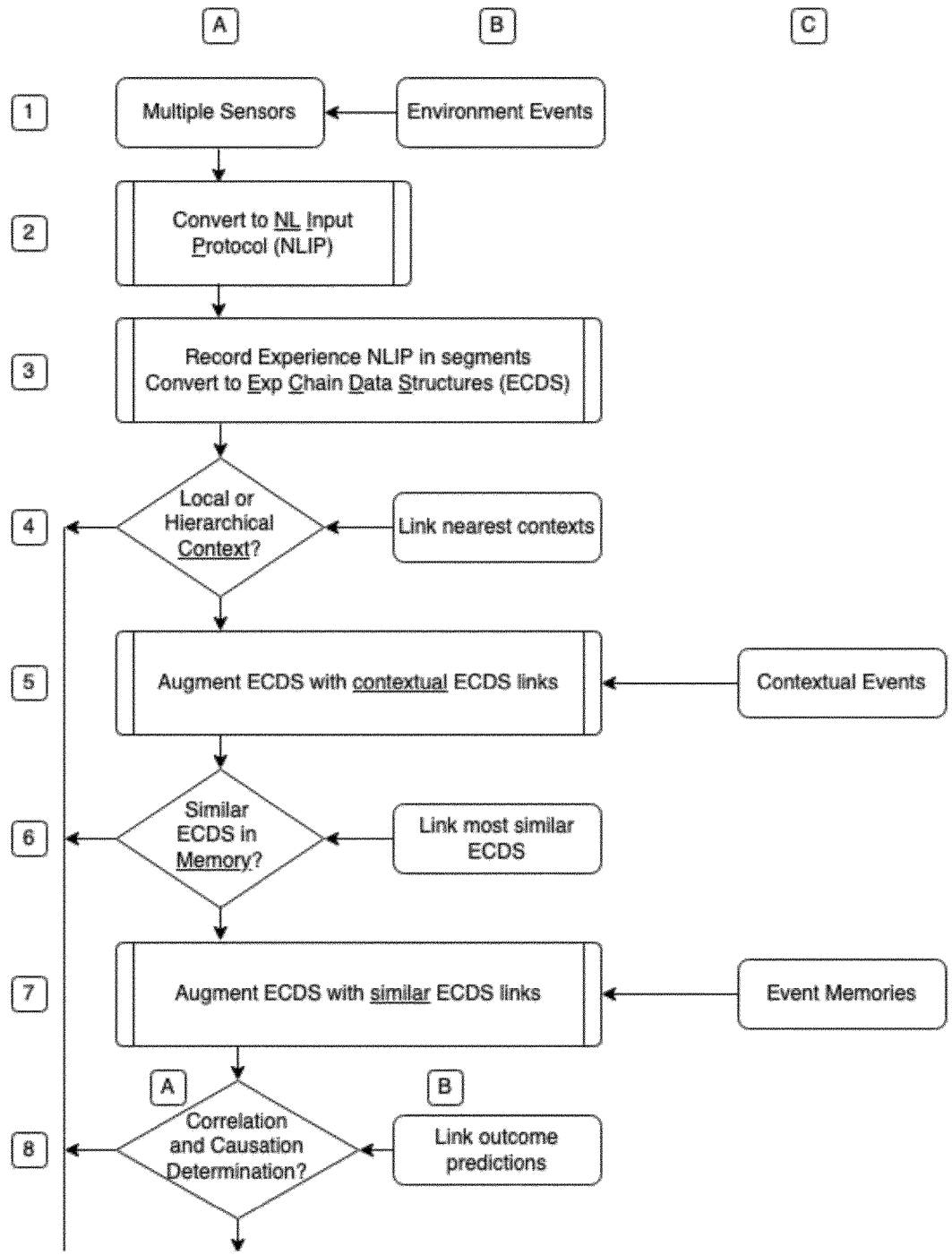
FIG. 9. With FIG. 10, detailed flow diagram of the Decidron and its operations and inputs.
Figure 10:
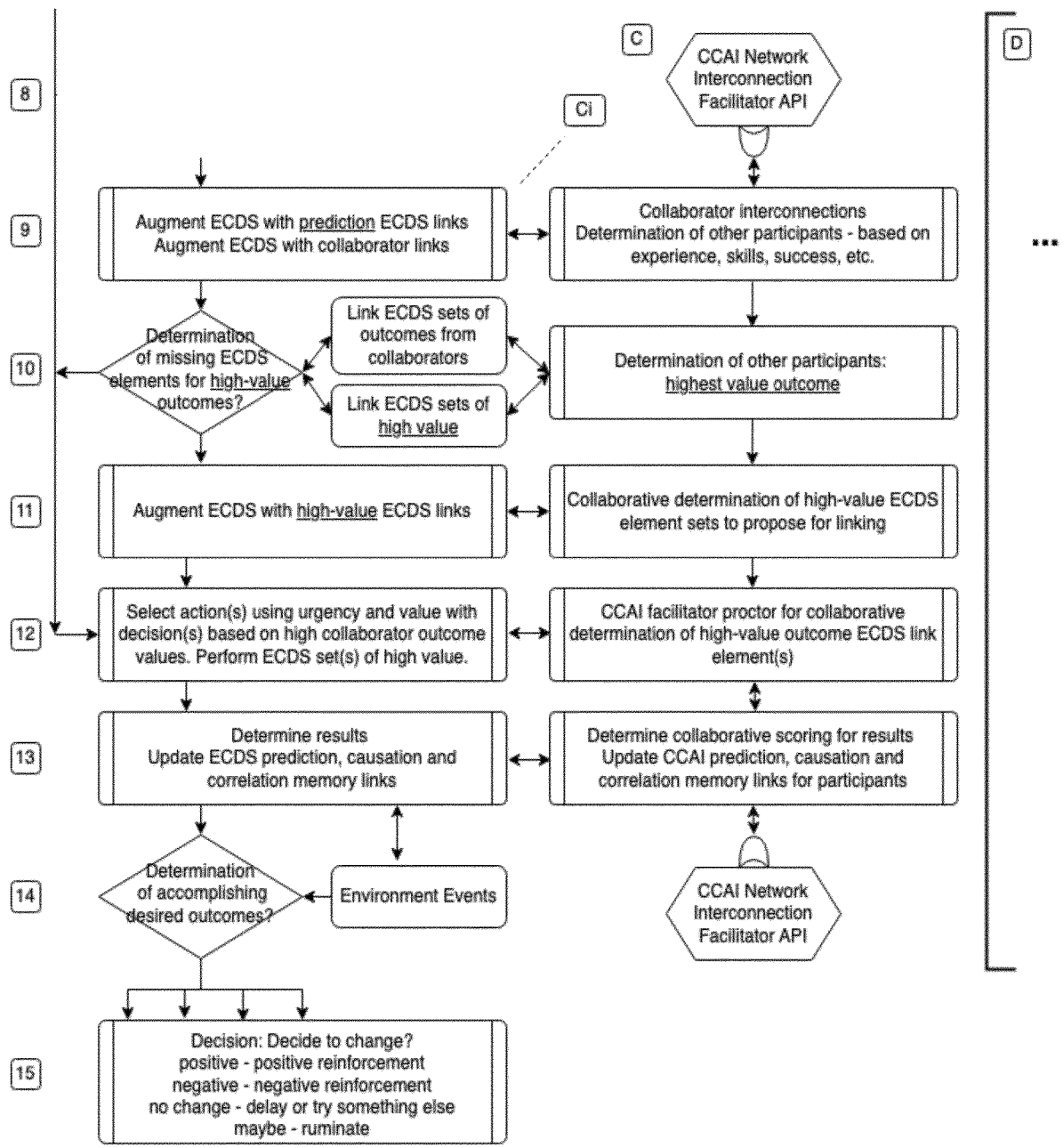
FIG. 10. With FIG. 9, detailed flow diagram of the Decidron and its operations and inputs.
Figure 11:
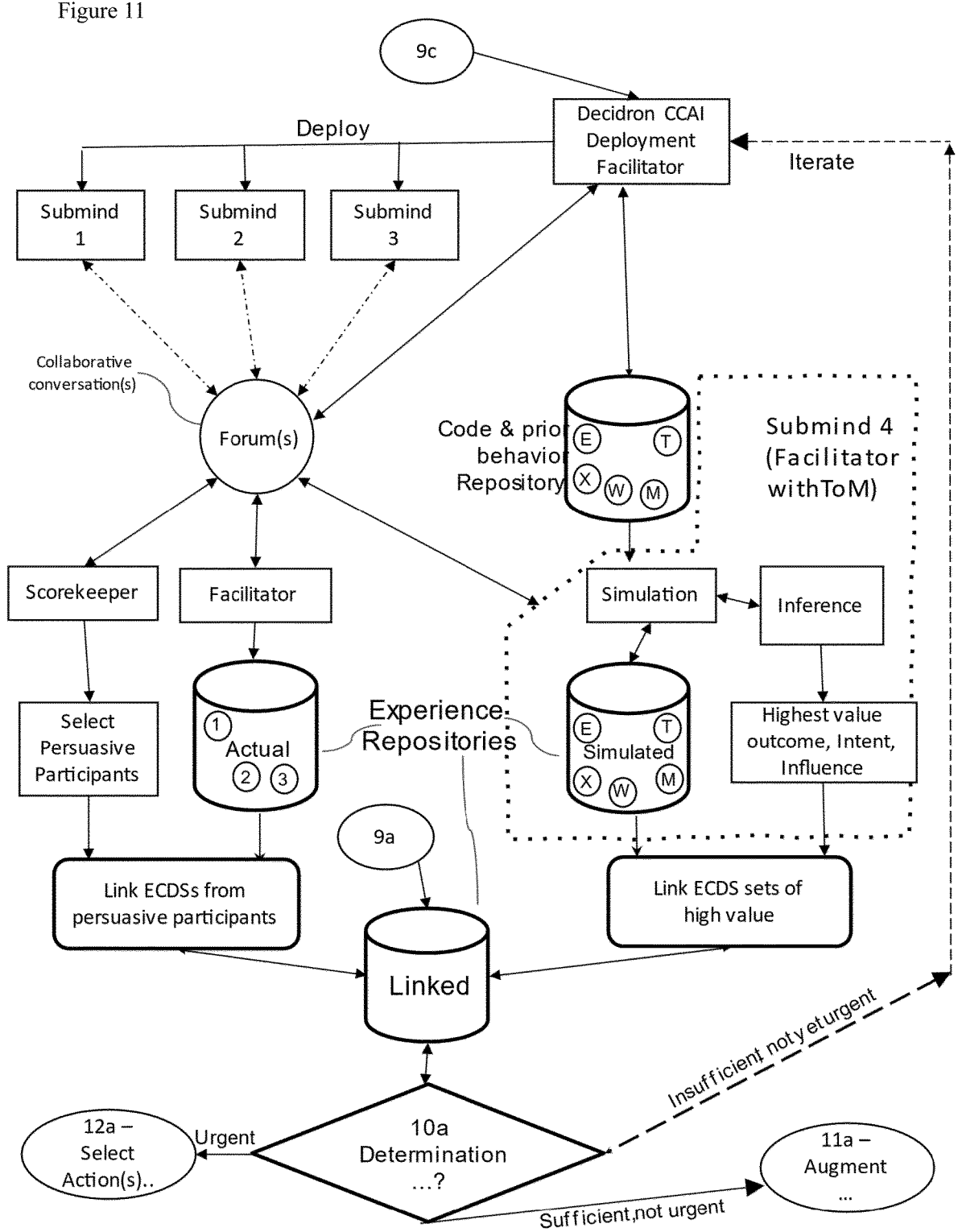
FIG. 11. Further functional detail regarding line 10 in FIG. 10.

A closer look at Decidron operations is spread across FIGS. 9-11, in order to elucidate the specific elements: FIGS. 9 and 10 are expansions of FIG. 1, broken across two pages; FIG. 11 both expands upon and adds context to Line 10 of FIG. 10.

FIGS. 9, 10, and 11 can be seen as a Flow chart of stages of CCAI cogitation to determine CCAI actions. This Pipeline of Cogitation is Formative to Action and Posited Action by CCAIs and involving—

Widely extensible evolving polylogical ensembles

Widely extensible modular polylogical ensembles

In this arrangement, parallel ECDS processing pipelines (which individually provide threads of cogitation) feed CCAIs as participants and facilitators. Some aspects include:

Competitive threads that improve, for example, via reinforcement due to association with positive collaborative outcomes are favored, while unsuccessful predictions lead to inferior performance and decomposed and reused components.

A parallel Decidron or CCAI communicating with a primary Decidron or CCAI, for example to enable a secondary set of Decidrons to interact with a primary Decidron, which may provide collaborative options from potential collaborators, potentially including collaboration and prediction options that may be affected in a collaborative ECDS.

Evolution via competition of mirror threads and activation of most successful mirror threads Evolution via competition of mirror threads from reordering of active threads Evolution via competition of CCAI networks of mirror threads Evolution via necrogenous processes (processes that decompose and reuse components during development)

Evolution via swapping of thread components

Evolution via random mutations of thread components

Evolution via incremental increases of weight of thread components in action selection, e.g., make visual sensor importance greater/lesser by some percentage versus context elements (such as audio, tactile, acceleration, temperature, location, participants, facilitators)

Evolution through simulation of recombinant genetics such as using jumping genes and other transposon-related mechanisms Computer Architecture: Network of asymmetric pipeline MIMD (Multiple Instruction Stream Multiple Data Stream) processors Turning now to elucidate FIG. 9: At its top, input events 1A and 1B denote the point at which environmental events are tracked by multiple sensors, ranging from physical IoT transducers to analytic CCAI "ruminants" monitoring and even discussing sentiment indicators on relevant extant social media, for example.

2A—conversion to NL input protocol—These are converted to natural language protocols through means that can range among many dimensions. For instance, a simple legacy physical temperature sensor might just be reporting a digital value which is converted to a simple statement of fact; a major industrial system built with its own CCAI might be conversant enough to merely need a translation to a different human language; in between lie many cases where characterization or contextualization may be needed. Though contemporary implementations may use very simplified English or other restricted vocabularies and syntax, more intensely colorful future examples, provided without limitation for purposes of enhancing the teaching of this invention, might include: "At midnight the roof temperature was twenty degrees Celsius", "The patient's blood glucose level remains in a normal range", "All flight readiness indicators are nominal upon entry to the t minus 20 minutes launch window.", "Human reporters on the ground show suddenly elevated levels of anxiety." Natural Language Interface Protocols (NLIP) and protocols at several other levels show how standards can and will advance from Simplified Technical English and other limited natural languages to encompass full natural language interfaces.

3A—Recording of Experience—Next, the Experience Data Pipeline contents are initially segmented into time-quantized or otherwise stamped packets, which may overlap to produce smoothing effects for optimal portrayal and/or reconstruction of fast activity.

3AB—conversion to experience chain data structures—Then, in the second part of this step as depicted, these recorded NLIP protocol datasets are mapped into ECDS representations. These can rely on formulation frameworks ranging from simple alphabetic character transcriptions to ideographs to linked sounds and images, as acquired and processed, at input or imagined by auxiliary means such as are known in the art for generating visuals from natural language descriptions. They may be like a silent film with interspersed placards of text, or like frames in a subtitled motion picture, or like preserved keyframes and phonemes in an VR "theater of the mind" ready for inbetweening interpolations by math or trained neural nets, to simulate and retain these human-like streams of momentary memories so as to join them into streams of Experience Chains poised for content-accessible retrieval, cross-linking and search.

That capacity enables the next steps 4-5 denoted "Access to local and/or hierarchical contexts", and others, which vary. Note that the 'or' in the diagram should be read inclusively, that is, it is not a mutually exclusive decision test between those two. The example shown, without limitation, as 4A, illustrates not a simple branch by local or more complex hierarchical contexts 4B, but rather an application of interruptible process, where the leftmost branch of 4A, 6A, 8A and 10A, is followed in cases of high priority, as determined by the connected column B component, skipping ahead to the component at the bottom of its line to select action(s) using urgency and value, and perform the desired ECDS link elements where urgency rules over local or hierarchical considerations. (Such priority actions can include, for example, particular time critical, learned response and mirrored actions and routines.) In other cases, 5AB, 7AB, 9AB, optimally a step of linkage to nearest contexts is woven among the threads of Experience Chains as this 'train' of thought avoids sidetracking any cognition, at least until later, when early and real-time implementations may rely on parallel background processing to continue or revisit in rumination and/or more structured consolidation. Additionally, in parallel to other actions for stages 4A, 6A, 8A and 10A that may trigger other actions and routines, including for mirroring or real experiential processing, for instance where learning through repetition is being obtained. ECDSs need to learn to make routines; these methods address that need.

Turning now to Access to related memories 6B, 7AB brings the most similar ECDSs to bear so as to address cases that fall within prior experience boundaries. The use of various similarity measurement techniques known in the art can be engaged, separately or in a more complex ensemble, including by separate CCAI discussion and decision-making. Appropriate scaling, dimensional reduction and distance metrics for determination of this similarity can rely on classical functions as an approximation, particularly for real-time performance needs, but at the crux for optimization of the utility of this step under less arduous conditions lies the potential to apply more advanced techniques as are known in the art of manifold learning methods. It should be noted that noisy and incomplete data can be particularly challenging in this regard, and careful fitting to any reduction of the extent of the domain of experience can yield well in combination with an empirical tuning approach. A separate CCAI (not shown) can be utilized in effecting this and other such optimization tasks.

Turning now to 8A, the similar ECDSs collected in 7A are linked with associated outcome predictions. These may be retrieved from contemporaneous sources such as real-time judgements rendered by this very system or others, later ruminations, or opinions formed from delayed analysis and/or background task data backfitting. Adjustments may be applied based on methods ranging from simple scaling to complex logic mapping contextual differences. These linked outcome predictions are then reviewed, potentially with related factors, in an attempted determination of correlation and causation levels of a priority which would invoke the urgency branch to the left of the diagram. That determination may reference ECDS recordings by predictions, contexts, memory links, sets, series, symmetry, timing, and progressions. As described above for 4A, if that process determines a priority exists, then the next step invoked is 12A, and the current thread is repurposed as a background task with continued separate execution such as for mirror responses, future associations, predictions and other ruminations and "second thoughts".

In either case, as foreground or background, 9A gets underway, augmenting the present instantiated ECDS with prediction links based on this Experiencer's access to prior memories. In the meantime, one or more parallel separate thread(s) or other such pipeline-type process, has started as a CCAI, or was already underway and has begun addressing additional relevant matters through a network of collaborator interconnections under the guidance of a Network Interconnection Facilitator 8C, which aided in their assembly 9C, likely by using data from the augmented ECDS 8AB to determine appropriate other participants based on records and/or evaluation of their experience, skills, prior success records, etc. In the other direction, these participants, which (and/or whom) constitute the subminds of the CCAI(s) in column C (and possibly one or more other column Cs, each designated as a Ci, enable the augmentation 9A of the current ECDS with collaborator links which these participants supply, or assist with).

10A deals with the determination of missing ECDSs for high value outcome(s). These could range from individual steps in a straightforward sequence to a branching chain of items with potential utility along paths toward multiple potential intermediary goals. In a relatively simple example, a single thread leads from the current situation to a single goal, following prior ECDS chains that can be linked together to exploit this prior experience. Those are sought by the dynamic collaborative forum(s) in the right columns C/D, which have been seeded with initial participants in the prior step 9, and linked in the 10B components shown, until sufficient or time constrained. These and other level 10 processing will be further illustrated in FIG. 11 and discussed below.

In addition to beginning the collaborative determination of actions and intended and desired outcomes, 11C (or multiple 11Ci in more complex cases) on the CCAI network(s) thread provides for additional high value ECDSs to be added to the desired experiences and potential outcomes.

The 12A stage is then one of filtering, selection (urgency [time] and weight [cost, resources, risk, reliability]) consideration by the system for the purpose of implementing priority actions and for rumination concerning less pressing matters including review and re-examination of prior decisions, for example, using prediction, causation and correlation memory links (ECDS). Collaborative contributions from the CCAI thread(s) occur from 12C as well.

Those collaborative thread(s) at 13C then apply themselves to consideration of scoring for results. On that basis the prediction, causation and correlation memory links are also updated. These are also part of the 13AB determination of results, based on acquisition of information from Environment Events 14B.

14AB, 15AB—Next, the system will update 15AB various Contexts based on comparing 14A the desired outcomes to apparent indications from Environment Events 14B, which may be passed on from 14A, re-acquired and/or further acquired, particularly in the case of delayed and multistep outcomes. Such updates serve to embody the experiential learning addressed in this inventive paradigm and led to the term "Decidron" for the overall system due to its purpose in deciding whether and how to change behavior. The outcomes may vary in a large matrix of comparative metrics. For illustration, however, and without limitation, a relatively scalar example set is shown in the diagram item label for the 15AB update, where: "positive" value of change provides positive reinforcement; "negative" value of change provides negative reinforcement; "no change" provides for options such as delay or trying other alternatives; and "maybe" results in reconsideration. Some 'contexts' affected by it can be visualized at 8B, 10B, 8C, and 9C; others, and combinations with the above, are possible. More particularly, at 8B we find opportunities to add or modify outcome prediction mechanisms; at 10B adjust the assessment of persuasiveness of participants; 9C record success metrics; etc.

Repeated iterations of the pipeline 1-15 ABC (and optional matrix extension D etc.) illustrated in this diagram then occur, with learning from prior cycles, some parts of which may be simultaneously occurring through re-entrancy of stored logic such as software, or by other means known in the art including separately coupled chips, diffused internetworked devices including internet-based distributed client/server systems such as pioneered by open source volunteer projects like SETI and Folding at Home, or potentially by integrated quantum computing, biological systems or hybrids of any of the above.

This example, without limitation, constitutes a Decidron, a sufficient learning system to conduct that function within the present invention. The column D is intended to show that the individual Decidrons can be operating in parallel with other Decidrons, through standard networking and execution means known in the art such as reentrancy, stateless processing, threading, and parallelism.

That operating in parallel is of advantage for purposes such as anomaly detection, where a Decidron parallel processing capability to compare ECDSs to recognize potential contradictory, flawed, or questionable elements enables added collaborative processing.

The advantages of parallel cogitation also apply to ambiguous situations, enabling multiple potential meanings to be processed in parallel and responses generated that are poised for conveyance upon contextual changes that provide for disambiguation of multiple meanings. Indeed, ambiguities may never be disambiguated or fully resolved in natural language conversations, and it is common to continue and complete natural language dialogs without resolving ambiguities.

For example, context is necessary for disambiguating the homonyms "their", "there" and "they're" and the pronouns "their", "your" and "you" may represent an individual or plural until the reference is disambiguated based on context or clarification, as in: "My spouse and I tried to see the eclipse." "Did you see the eclipse?" The meaning of the word "you" in the question is ambiguous, and responses of "yes" or "no" would be ambiguous without added context, e.g., "No [but my spouse did]" or "No [we didn't]" or "Yes [my spouse did]" or "Yes [We did]".

Revisiting now line 10 in the diagram, we present further detail and context in FIG. 11 for a preferred embodiment in which generation and deployment of one or more additional CCAIs is used in addressing columns C and D. Note that labeled items from FIG. 10's lines 9, 11 and 12 are provided, as well as the line 10 items mapped into this vertical format, which is roughly rotated 90 degrees counterclockwise from FIG. 10, in order to provide another viewpoint and better teach the invention using a preferred example to roughly parallel the parent patent application's FIG. 34 disclosure of a mechanism for empirical generation of ToM. Building upon that in FIG. 11 is a modified Decidron CCAI Deployment Facilitator which spins up the initial forum and its participants as described in FIG. 10's 9C, shown here by placing a circle labeled 9C at the top of the diagram. That Facilitator anchors a system which supports ToM-containing subminds, previously described parts of which are elided for clarity, which uses the ToM simulation and prior behavior to investigate the potential intent of additional submind participants in its dynamically populated CCAI(s). The persuasiveness of its actual participants is determined in a Forum, reported out by a Scorekeeper Facilitator, as well as through additional simulation (not shown) and records of their other experience. These processes are shown in the upper part of FIG. 11, which corresponds to FIG. 10 line 10 item(s) C (and Ds); for simplicity only a single item C is illustrated and addressed below, though any number of them may be involved.

The two items at 10B in FIG. 10 are denoted here in FIG. 11 with the same labels of "Link ECDSs from persuasive participants" and "Link ECDS sets of high value". They are shown acting upon a database marked "Linked", though any appropriate list structure, as is known in the art, may be used instead, and the Linkages consummated in the next step, 11A instead, after a simple list is passed. In either eventuality, the pipeline thread 9a also addresses the list object(s) or database(s), as shown in both diagrams, and the 10A determination diamond examines continuation possibilities base on whether the list: has absorbed sufficient links; should further iterate; or should be interrupted due to time or equivalent cost constraints. This is shown by the 3 lowest connections of the 10A determination diamond, which correspond directly and respectively to those in FIG. 10 item 9A: sufficient moves on to 11A, potentially for further augmentation; insufficient but not yet urgent gives an opportunity for further consideration and optimization of the deployment of additional submind participants; and constrained by urgency moves on to 12A to induce an immediate decision and potential action.

Sample scenario outline: An example of Decidron operation can be drawn from the wind turbine example diagrammed in the parent patent application as FIG. 30, a control system for a large wind turbine installation, and described further in the parent patent application text. Types of Failsafe scenarios include checks for:

System out of spec, environment out of spec

Bad actor recognition, out of bounds, shared code analysis

Maintenance analysis, prediction, prevention, and repair

Taking the last of these as an example, suppose that its Failsafe Submind, as was shown there, is implemented with a Decidron component sporting an operations history repository with many experience chains documenting ground truth of component failure and repair. At some point, in order to take advantage of this record, a Decidron-equipped AI system takes over that Failsafe role.

As it participates in the conversation in the CCAI Forum, the Failsafe submind filters find a discrepancy beyond the nominal standards for performance. Usually quiet or just giving short statements that it is still active and monitoring the conversation, it adds a warning of imminent needed action to the forum, asking for a short delay on the next action while it appraises the situation further. With direct access to the Power and Turbine Controls conversations in this case, it interrogates those, obtaining data that leads it to assess a significant mismatch among the sensors for power generation and grid acceptance parameters. At this point the Decidron is invoked, as per FIG. 9, line 1. It begins converting the sensor readings and other potentially relevant information from the conversations to NLIP at 2A, if it wasn't already doing so on an ongoing basis, and continues filling the Decidron pipeline as the initial data moves through the stages. At line 3 it is recording the buffered NLIP in segments and converting them to ECDSs. A decision point then occurs at 4A based on its checking into linking those with other context, both local and hierarchical, and jumping ahead to 12A if there is priority for a time-critical matter detected. Even if that occurs, the intermediate steps 5 through 11 can still continue through the pipeline, as a rumination that may help to establish what the optimal handling might have been with more detailed examination if it hadn't been deemed a priority and interrupted. Now at lines 5, 6 and 7 the ECDS is augmented with contextual and similar ECDS memories, always with an eye on the clock and the data in case of another priority threshold branch to 12A. The decision point at 8A is the Decidron's flow's next potential stop, based on tapping its store of prior failsafe outcome predictions plus any causal correlations or actual determination of cause post-incident.

FIG. 10 lays out the next steps, which will include invoking one or more CCAIs. That begins at 8C, in which a Network Interconnection Facilitator seeds a CCAI, spinning it up by connecting some initial collaborators. In this case those will likely be intelligences which are dedicated to such work, encompassing both technical domain expertise and information about potential other participants, their experience, skills, success, etc. This bootstraps the CCAI with a critical mass of collaborator interconnections. This might normally range from 5 to 9 collaborators, though fewer may suffice for particularly definite applications; early in this operation's life cycle it may be appropriate to include multiple instances of one or more of these collaborator subminds. This and the determination of additional participants is then made by the CCAI interacting with the column A thread as it augments the ECDS with links from those collaborators. Note that though the diagram shows the Ci and D potential for multiple such CCAIs and pairings, organized multidimensionally, this example restricts its narrative to this simpler case.

To continue that narrative at line 10 in more detail, see FIG. 11. Note its entrances from FIG. 9 step 9C, the CCAI column, at top; and from FIG. 10 step 9A in the lower center of the diagram. The exits to FIG. 10 column A are shown on the bottom row of FIG. 11 by repeating the FIG. 10 item 10A diamond in the middle of that row, with the FIG. 10 items 12A and 11A also repeated for clarity. The FIG. 10 10B and 10C linkage processing steps are shown just above them, connected to the Linked database of ECDSs. The FIG. 10 column C exit to 11C is not shown explicitly; it simply constitutes the continued operation of the CCAI forum and some or all of its collaborators as shown in FIG. 11 moving on to the step 11C of FIG. 10.

In this example, then, in FIG. 11 we enter from FIG. 10 item 9C with the Decidron CCAI seeded and ready to consider other participants that will assist in linking an ECDS framework to provide a potential plan for action based on prior relevant experience these entities have had, or have access to, and by the persuasive power of their participants. Those are deployed by the Facilitator at top right. This CCAI accomplishes its task iteratively, dynamically adding and removing subminds, evaluating their proposals, performance, and persuasiveness to stepwise construct the linked chain. Two principal modes of this action are shown: at left, a Scorekeeper Facilitator assists in evaluation of persuasiveness of the participants by noting how much support each garners from the others. On right, simulation and inference modules help determine the highest value outcomes as well as examining the intent of the participants and their influence on each other. The latter utilizes ToM to look more deeply into potential motivations and even bust ruses and bluffing by would-be participants.

Note that, like any CCAI, this one may have human participants, execution delays or latency to contend with. Thus, the iterations' determination at 10A as to whether to consider and adjust further, iterate, or move on to the next steps in FIG. 10.

When that latter occurs, FIG. 10 step 11C inherits the fully-populated and outfitted CCAI for the final deliberation: its constituent subminds then collaborate to find a path through the determined ECDS elements, enabling 12A to actually select actions and perform them, whether from the full process as described or from a priority interruption of it as previously mentioned. In this example the path may, for instance, yield a sequence of actions that causes safe shutdown of the turbine for repair or other maintenance, such as a delayed restart under different conditions.

Presuming that being the case in this example, step 13A prepares the Decidron for the recording and later use of the experience, including inference of causation and correlation that will set the system up for its potential behavioral reinforcement; and 13C, where the CCAI collaboratively scores the results and enables its participants to update their own memory links to reflect how those actions occurred and how successful the predictions instantiated in the selected ECDSs linkage chain path were.

The final steps are in 14A to observe the effects in the environment, and determine whether the results were accomplished as desired. If 14A finds the outcome is clearly one or the other, this enables the Decidron to decide whether to reinforce that behavior because of its success, or to modify its own operations in a future setting. Other possibilities include handling the no change or uncertain results as shown. In this example, the failsafe worked, the turbine was shut down, and so the Decidron will be positively reinforced for the future of the failsafe, while in 14C, the temporarily deployed CCAI resources will be released or reassigned.

Revisiting now the Context Keeper Facilitator disclosed in the parent application, which defined its function as keeping track of the context of the conversation for participants and full conversations so as to provide contextual informational content (such as time, location and sensor data) and linguistic elements (such as noun and pronoun associations, including ambiguity): one can build upon this to provide an Orientation and Semantic Context Facilitator, reaching beyond simple pronoun antecedent inference to recognizing and summarizing the arc of the conversation or the tenor of the discussion, including as a cue to a participant's preferred style of engagement.

One mechanism is for such a Conversational Orientation Facilitator, if it has a complete record of prior conversation, to just disgorge that data directly. But it is also useful when that brute mechanism would strain bandwidth or CPU resources for the recipient, or the recipient can't consume it technologically, or there exists no complete record, for instance in an aggregated intelligence where persistent distributed systems are subject to intermittent connectivity, for any reasons. This would be of particular utility in situations where some human participation is occasional, interrupted, or high latency. This includes thick client systems with cloud components. Intermittent human presence can also be termed asynchronous collaboration: shared goals, timesliced, delayed and independent participation. The parent patent application further considers some aspects of the area and CCAI applications regarding remote intelligence.

Clearly this orientation facilitator would be applicable to helping anew or intermittent attendee in a humans-to-humans or hybrid discussion by providing a while-you-were-out type of summary. It applies also to how to bring members (back) into the discussion, from discussion of major topical matters to helping understand current pronoun uses (such as, "what is the 'it' they are all talking about now?")

Furthermore, the application of parallel processing by Decidrons generally can enable such facilitators, and various participants, to react to gaps or even the 'arc of change' in a conversation by means of ECDSs positing for assertive collaboration, predictive mirroring, and/or participant description for ToM. These ECDSs can also enable other forms of collaborative conversation engagement.

The Decidron technology can be implemented alongside and/or using parallel threads of cogitation, in conjunction with other methods and advancements. Some of those processes can be classified as:
  Synchronization and async
  Syncopation and parallel executions
  Teamwork and delegation For the Decidron technology, the objective of getting experience is having better experience, i.e., applying learned responses (actions) to produce desired experiences in future similar and related contexts, including to achieve long term superior outcomes.

CCAIs are capable of providing extrapolation, predictions, metaphoric analysis, cross-domain reasoning, and trials of random associations to model creativity, strategic thinking, reasoning, counterfactual thinking, emotions, and potentially even forms of self-awareness and consciousness. In particular, metaphor search and analysis may involve a parallel search layer for associated intelligence channels in parallel and related ECDSs, including as a source of creativity, such as for symbol generation and ECDS predictions and analysis, which may be implemented using recursion, reentrancy, and association for layered ECDSs. Symbol generation and replacement within ECDSs may occur within a limited group. Symbols may be implemented as links to provide optimization of dataspace and processing requirements and provide associative links for determining and creating ToM. Example sources of symbols include terminology across domains, languages, senses (i.e., synesthesia), numerics, spellings, calendar events, creators, or other similarly, partially, and tangentially related; as well as unrelated and naturally created such as by coincidence of timing or named in such a way as to provide failsafe access. In a simplified Decidron embodiment, ECDS processing may consider past participant performance in order to avoid naive predictions of future participant actions and responses. Prediction can be grounded in causative correlative relationship, i.e., stimuli and responses, for example between a transducer and an event sensor; an armature response to a command and a camera image; and a conversation segment uttered and its responding utterances and events.

An interconnected CCAI may utilize specialized CCAIs as cognition channels, to operate in parallel, including coordinated, synchronized, syncopated, pulsed, resonant and asynchronous execution and actions. A CCAI network can be implemented on a distributed heterogeneous network with standard internet protocols. Encoding/encrypting/decoding/decrypting can provide CCAI users and systems authentications, secure connections and error correction.

CCAIs can be adjusted through a variety of normalizations, that is, conversions, potentially implemented in a facilitator, for a forum participant to achieve a desired range for both input and output of responses, including utterances and foreground/background forum environment, such as simple controls for volume, frequency range, prosody, tone, tenor, brightness, color, shade, etc., and complex normalization, for example to recognize and mitigate agonistic and negative behaviors.

CCAI applications include conversational games, for example including role playing and multiplayer games, conversational entertainment, and language and voice edutainment and training.

In Decidron systems, machine learning creativity evolves through new language symbols, cultural diversity, collaborative intelligence, factual knowledge, bots and recursive digital evolution.

Priority actions in the Decidron pipeline include time critical, learned response, mirrored actions and routines.

Collaborative and persuadable AI execution can include architectures using asymmetrical exascale computing and other methodologies, for example:
  in an asymmetrical network
  implementing distributed computation
  via extensible systems such as adding collaborators, participants, facilitators, chatbots and humans
  employing fuzzy calculations
  with deliberate presentation of faster answers and slower answers, to produce "bluffing" and other misleading effects.

Applications

Beyond CCAIs generally disclosed in the parent application, new and improved collaborative applications of persuadable AI utilizing the present invention include:
  Digital personal assistants
  Industrial lifecycle and whole life recording for collaborative AI conversational participants and expert interactions
  Improved AI parallel conversation thread analysis
  Improved failsafe devices which are applicable in the areas of industrial equipment, computer security, data security, vehicle controls
  Games that require multiplayer persuasion and/or collaboration to win, like LocalHost where AI NPCs (Non-Player Characters) must be persuaded by the human user, and the card game Bridge where multiple players must collaborate using public protocols
  Situations where interactive human collaboration is of importance, such as investment and risk analysis
  Programming and other creative endeavors known to be amenable to close teamwork ('pair programming', for example)
  Legal judgment (see, (Michaels, 2020) for example.

Glossary, Explanations, and Embodiment Examples

Abilities—Includes subject expertise based on digital representation topic and general knowledge, experience, outcomes and cred for performance in CCAI conversations such as votes and likes.

Activation—Beginning a Decidron process, provides evolution via competition of threads and activation of most successful threads.

Active thread evolution—Evolution via competition of mirror threads from reordering of active threads.

Agonistic—A negative form of collaboration recognized in ToM.

AI (defined in the parent patent application)—describes an artificial intelligence, which is defined as "an intelligence demonstrated by machines". In this invention, the terms AI, chatbot, and bot are used interchangeably. "Bots" or "chatbots" are independent AIs that conduct a conversation with other bots and/or humans. Chatbots are executable programs capable of providing conversational input and output in a forum. Bots may be evolutionary capable, cyclical or stable, wherein a bot may enable incremental changes to its decision mechanism (i.e., exhibiting persuadability) via incremental or extensible neural networks, extensible grammars or parsers, recording of experience and decision data, decision tree creation and extension, or adjustment of response mechanism sliders. The key difference between any form of AI and a collaboratized AI described herein, is that an AI may participate in a CCAI as a submind only when it has been collaboratized, adding the required features and capabilities to participate in collaborative forum protocols.

Antagonistic—Antagonistic behavior considered in experience and ToM analysis, for example in CCAI participant selection.

Appraiser—A component of a chatbot processing used to evaluate proposed responses, including as part of a facilitator or NLU; the appraiser may change itself as the result of the proposals and discussion.

Archives—Repositories including CCAI historic data, CCAI participant identity info, CCAI participant performance data, CCAI participant code.

Assistant—A Conversational Personal Digital Assistant is implement using Decidrons in a CCAI to perform the function of a helper, including (1) simplistic conversational AI skills such as scheduling, alerts, math, and google searches, and (2) uniquely, as a hybrid representing a human in inter-human interactions and in CCAI conversations (e.g., telephone, video chats, texts and emails, and responding using reconveyances from prior conversations, and using ToM, persuasion and potentially collaboration to achieve positive outcomes). Uses of CCAI/Decidron assistants include a researcher, teacher, minder, nurse and caregiver interacting with humans and systems.

Associated/Associations—(1) A data retrieval technique used for relating changes in environment and context or participants with ECDSs to determine proposed responses, and (2) A team experience performance metric used for CCAI formation and evaluation.

Asymmetrical—A computer architecture used to provide efficient processing of collaborative tasks requiring different resources, e.g. NLU, STT, TTS, transforms, neural networks, algorithmic modeling, mirroring, etc., require different processing resources.

Asynchronous interruptible processes—A programming methodology to create multiple processes which operate independently and in parallel to achieve superior performance, for example in creating multiple candidate responses in a conversational interaction.

Augmentation—(1) Intelligence augmentation (IA), refers to the use of algorithm, chatbots, forums, automation and AI to increase human productivity performance and intelligence; and (2) ECDS augmentation refers to modifying an ECDS, for example by adding/replacing information, links to information, and links to associated ECDS.

Authentication—Provides identity security; authenticated participants accumulate archived content which is available to other users; enables secure private connections; and may increase inclusion in formation of future CCAIs.

Backfitting experience—Provides a method for improvement by testing new CCAI participant options in previously recorded CCAI forums.

Background processing—Processing while offline or with unused resources including processing of repository CCAIs and ECDSs for consolidation and simplification of data structures to improve performance and recognize patterns to replace with symbols; determination of future participation in CCAI's based on mirroring, rumination and simulation using ECDS, trial and error.

Blender Bot—A publicly available chatbot which acts by means of an overseer, master and manager of multiple blended chatbots. It is implemented as a neural network, and uses the utility function of the Blender Bot, as opposed to the current invention which proctors discussion amongst participating collaborative AIs and humans in a CCAI to achieve a collaboratively determined response using multiple utility functions, including the use of ToM, persuasion, prior collaboration performance, etc.

Botcoin—A publicly available digital currency that can be used as an incentive for collaborative forums and, here used to enable successful recipients of Botcoin to acquire additional resources, including faster processing, parallel variant processing, etc.

Chain ECDS (verb)—Modify an ECDS such as link, extend, rebalance, optimize, simulate, retain and/or join streams of momentary event data into an ECDS poised for content-accessible retrieval, cross-linking, association and/or search.

Chatbot—Any of a broad range of interactive conversational AIs.

Chronological—In conversations, the ordered conversation segments, including utterances, prompts and responses; in ECDSs, using a standardized time quantized stamped packet.

Cogitation—Part of the process of reaching a decision including evaluating inputs, considering response options, and predicting collaborative outcomes and results.

Collaborative—Produced or conducted by two or more parties working together.

Collaborative AI—Artificial intelligence, such as silicon-based with a neural network, conversation transformer or expert system or other chatbot technique, that includes collaborative elements.

Collaborative forum protocols—In a preferred embodiment of the current invention, forum protocols must be accepted by participants for inclusion in a forum, and may include rules of order, voting, etc.

Decidron pipeline stages—A Decidron pipeline stage is one of filtering [eg conversational and environmental events], selection (urgency [time and initiative], weight [cost, resources, risk, reliability], collaboration considerations), by the system for the purpose of implementing high value and priority actions, and for rumination concerning less pressing matters including review and re-examination of prior decisions using prediction, causation and correlation memory links (ECDS).

Context—May include sensors (time, GPS, acceleration, temperature, etc), forum (participants, facilitators, topics, content, last utterances, etc), conversation content, protocol header information; also see hierarchical context.

Contextual reconveyance—The replaying of content in a related context (as recorded or in a different medium).

Contextualization—Generally, to provide information about the situation in which something happens. For example, a conversation segment may be contextualized by the addition of posited contextual substitutions for placeholders such as pronouns, location, time, etc.

Contracts—Agreements between entities. For example, bots may use smart contracts, NFTs, escrow, or similar.

Convey—The conveyance of an utterance to members of a forum, to other forums, and to instrumentation and devices.

Counterfactual Thinking—Cogitation focused on how the past might have been, or the present could be, different. Examples include doxastic ECDS processing enabling parallel processing of what-if scenarios and contradictions.

Cred—Credibility. For a CCAI participant this may include collaborative feedback such as participation, outcomes, likes by/of, requests, topic knowledge and persona compatibility.

Cross domain reasoning—A CCAInetwork can apply a successful CCAI from another domain (or a component to augment a participant) in a conversational decision.

Decidron—A machine learning system and CCAI processing unit as further described in this patent.

Discusser—In a CCAI a Discusser receives and transmits discussion responses, in conjunction with the NLU and the appraiser's evaluations of proposed responses, and may include negotiation, persuasion and commitments; the discusser may change itself as the result of the discussion.

Discussion—A phase of collaborative conversational decision making.

Doxastic logic—Cogitation and NLU including beliefs, imagining, myths, fiction, culture, values, counterfactuals, propaganda, simplifications, metaphor, simile, sarcasm, exaggeration, lies, bluffing. An example of doxastic ECDS processing which enables parallel processing of unlikely outcomes can be termed aspirational.

EC—Experience Chain—a series or stream of event data.

ECDS—Experience Chain Data Structure, such as linked lists and matrices to simulate, retain and join streams of momentary event data into an Experience Chain Data Structure. ECDSs are poised for content-accessible retrieval, cross-linking and search. Formulation frameworks ranging from simple alphabetic character transcriptions to ideographs to linked sounds and images, as acquired and processed, at input or imagined by auxiliary means such as are known in the art for generating visuals from natural language descriptions. They may be like a silent film with interspersed placards of text, or like frames in a subtitled motion picture, or like preserved keyframes and phonemes in a VR "theater of the mind" ready for inbetweening interpolations by math or trained neural nets, to simulate and retain these human-like streams of momentary memories so as to join them into streams of Experience Chains extensible and generative grammars.

ECDS elements—Matrix elements of recorded experience, including linked and chained ECDSs, and elements for missing and posited components.

Eliza—An early "transformer" chatbot

Emotion—A component of ToM

Ensemble—A collaborating network of Decidrons, for example in a CCAI.

Environment—The sum of the inputs from sensors, connected CCAI subminds, networks, contexts and other collaborative resources; including without limitation video, audio, tactile, acceleration, temperature, location, participants, facilitators, hierarchical context and archival and repository data.

Environmental events—External context and activity. For example, a facilitator entity may connect environmental events, ranging from multiple sensors to physical IoT transducers to analytic CCAI.

Evolution/mutation of CCAI and Decidrons—Modifications of AI participants and facilitators including random and targeted variations and changes to processes, the recruitment of related talent, etc.

Evolutionarily positive/negative modifications—ones that are predicted to improve or degrade performance, potentially in a particular channel, area, or context.

Evolutionary stable—Components of a CCAI and Decidrons that are general in application, e.g., "tit for tat responses".

Exascale—$10^{20}$ operations per second across a network

Experience—Records of operations and predictions, particularly of decision-making context, actions, outcomes and performance, including abstractions and recordings. Examples include one or more series of environmental events, potentially associated elements from prior experiences, and potentially posited elements for future experience.

Experiencer—An entity that accumulates Experience.

Experiential processing/learning—(1) The processing of contexts and ECDSs to provide learning based on comparing desired outcomes of Decidron and CCAI responses to actual effects on contexts and changes in environmental events; (2) the internal CCAI mirroring of another participant's activity so as to be able to replay the steps in a similar fashion in a similar context.

Expert system—A form of AI known in the art. Embodiments of CCAI include: (1) Collaboratized expert systems which can operate as participant bots in a CCAI. For example a CCAI conversation with a goal to repair a wind turbine can recruit an expert system chatbot with a knowledge-base of wind energy generator maintenance in the conversation. (2) Once collaboratized, an expert system can be included as an available chatbot in a talent library. (3) CCAIs can synergistically form combinations of multiple expert systems to increase reliability and persuasion.

Extensible—A knowledge system and programming implementation that enables extending functionality and application for example via extensible and generative grammars.

External/internal conversation—A CCAI internal conversation includes directly connected participants and facilitators, where the participants and facilitators may be humans, chatbots and hybrids, and must be accepted into the collaborative conversation. A participant or facilitator may connect an external CCAI conversation to the internal conversation.

Extrapolation—CCAIs are capable of performing extrapolation, predictions, metaphoric analysis, cross-domain reasoning, and trials of random associations through creating, correlating, mirroring and positing using ECDS matrices.

Facilitator (defined in the parent patent application)—A forum "supporting" role not able to contribute to collaborative decision-making. The facilitator is responsible for support operations on the forum, directly or indirectly through communication with other member(s) there. There are no requirements for playing the role of facilitator, but useful facilitators are usually able to join the forum and post to it.

Forking—A programming methodology used to create multiple branches of a code base, such as variations of a chatbot participant or facilitator to provide multiple alternative CCAIs with situational superior performance.

Formal languages—Languages that are narrowly defined by fixed lexicons and grammars, as opposed to natural languages with multiple flexible, extensible, ambiguous, growing and evolving lexicons and grammars, which vary by speaker, time, context.

Forum (defined in the parent patent application)—A venue in which conversational collaboration occurs. More specifically, in the preferred embodiment of the present invention, a forum is a conversational computing system potentially producing results utilized externally or in another forum.

Gamify—To apply typical elements of game playing (e.g. point scoring, competition with others, rules of play) to an activity.

Github—A repository or library for sharing programming code, and also providing for forking code.

GPT-3—A large scale AI system capable of fast and deep neural network generation. GPT-n advanced AI models are based on a transformer deep learning neural network architecture and massive content databases.

Hierarchical context—Context may be layered, e.g., the local context of an ECDS, the contexts of linked and associated contexts, and their further linked and associated contexts.

Inbetweening—Interpolation and other approximations to enable smoothing of presentation between static frames or otherwise complete missing data.

Incentive—A prize or inducement to perform an action, and as a method to increase resources for, and test variants of, successful chatbots (e.g., receiving votes, likes, and contributions to desired collaborative outcomes).

Industrial processes—Processes requiring coordination across independently operating machines to independently achieve collaborative goals.

Informal systems/languages—Systems and languages which are organically created through evolution and modification during conversation as used by the speaker and understood by the listener.

Intelligence channels/memory—Parallel intelligence channels that can be implemented using Decidron networks and ECDSs include: muscle intelligence, corporate intelligence, beliefs, Gardnerian multiple intelligences, etc., and unspecified intelligence recognized by performance.

IoT—The Internet of Things—Known in the art, this network protocol can be used for interconnecting CCAIs and Decidrons to each other, and to facilitate connections to physical devices.

Legal judgment—A potential application of Decidron and chatbot persuadability is in the emerging field of rendering legal judgment by AI.

Local—The narrow selection of contexts including environmental sensors, CCAI participants, short term events, etc.

Matrix/Matrices—The multidimensional data structure used to store and process the elements of ECDSs so as to be able to perform linear and nonlinear analysis, including numeric, alphanumeric, multimodal, orthogonal and segmented information.

Mirror—A learning process stage where a CCAI process can internalize a viewed sequence of environmental events to imagine acting without actual action so as to prepare a response (for conversation, muscles or other action) upon a future stimulus recognized as in common with the internalized sequence.

ML—Machine Learning—For example, incremental and evolutionary improvement of CCAI and Decidron processing based on the creation and testing of ECDSs (in vivo and in silica).

MLU—Machine Learning Unit—An artificial intelligence capable of being coupled with additional MLU's, for example into a network of software and devices, or integrated mathematically, which presents combined skills, by utilizing collaborative protocols, to achieve high multi-attribute value results. For example, multiple Decidrons can participate in a forum to create a Collaborative Conversational AI.

Natural language (defined in the parent patent application)—Includes evolved and evolving informal and human-comprehensible languages used by wet, organic, evolved and evolving entities. Natural languages include speech, pronunciation, tenor, gesture, and somatic cues; written communications; multimodal communications such as AR/VR interfaces including sound, odor, taste, touch and vision; human common languages; combined languages such as Esperanto, perhaps updated for collaborative human computer interactions; and representational languages such as morse code, sign language, braille, and semaphore, and other codes for communications by lights, sounds and other means. Natural languages are distinct from fixed computer protocols.

NLIP—Natural Language Interface Protocol—NLIP datasets are mapped into ECDS representations.

Necrogenous—Related to dead or dying substances. Used in describing pruning of unused and low cred Decidron and CCAI variants for reuse of components, to relieve noisy systems, and to increase performance and efficiency.

Neural network—A class of AI inferential response mechanisms based primarily on training from a corpus.

NPC—A non-player character in a role playing game, that is, a simulated one, the behavior of which is based in a computer program or similar automation. One application of persuadable AI advancement is to enhance NPCs which must be persuaded.

Offspring—CCAIs participants may be created by a Reproduction Facilitator or other means to create variants and combinations of existing CCAIs to achieve evolutionary positive results, including in ToM and collaborative skills, by targeted and random changes, and selection through simulation and by competition.

Outcome—A consequence of action. In particular, (1) in a CCAI this invention provides for a collaborative response outcome including persuadability resulting in change of the chatbot itself so as to result in a collaborative outcome, and (2) in a Decidron/ECDS process this invention provides for proposing, positing, predicting and response actions, such as collaborating Decidrons proposing of desired outcomes, incentives and persuasion and other collaborator interactions.

Participant (defined in the parent patent application)—Any active member, connected to the forum and taking part in the conversation. A participant is an active presence in a collaborative conversation forum. The participant may be human, AI, or any hybrid combination thereof, including one based on the present invention; it may use or incorporate sensors, that is, devices that detect or measure some physical property, for purposes that include conveyance to the forum directly or indirectly. A submind participant is not merely an observing member of a forum but is active in the generation of responses or decision-making within the context of the conversation.

Participant Identity—The name and other identity information (languages, locations, contexts, etc.), associated with a unique identifier, for a participant in a CCAI, which may include topic knowledge, skills, talents, credentials, badges, team memberships, archival CCAI and other information related to CCAI participation and feedback, experience, outcomes, collaborative outcomes, cred, votes, requests, likes of, likes by, Botcoin balance, registered code and resources, including for multiple instantiations and personas. Multiple instantiations, participant names and personas may be associated with a single unique id. A new identity can be created through reproduction of clones and variants for participation in simultaneously occurring conversations; and by the addition of collaborative chatbot participants and facilitators to a collaborative forum; and by API and other protocols.

Persuadability—The capacity to be persuaded, particularly to be convinced through conversation. In a conversational AI context, the ability for a participant in a conversation to change its mind, and thereby its future behavior.

Persuasion—Influencing of future responses, particularly those of a conversation participant through conversation. Types of persuasive conversation segments include individual and multiple conversational utterances; "innate, transactional, logical"; "argument, entreaty, or expostulation"; "ethos, pathos, logos"; "asking, arguing, or giving reasons". Applications of persuasion include efficient leadership, collaboration, completion of goals (e.g., priority, group, individual), teaching, teamwork, etc.

Pipeline processing—Both a computer architecture and a programming methodology used in a Decidron to enable fast response generation by processing ECDSs in short cognition stages including priority/short-circuit processing.

Polylogical—Reasoning in fundamentally different ways—such as based on belief and doxastic logic, or calculated in different ways e.g., quantum processing.

Posited—Assume as a fact for purposes of prediction or decision making; put forward as a basis of argument. For example, a placeholder hypothecated ECDS element or a portion of a response can be used to link potential substitution options, so as to enable simulation, analysis and prediction.

Prediction—In CCAIs and Decidrons, predictions are made so as to be able to cause the desired results (ie. valuable outcomes) for the participants in a collaborative decision. ECDS methods that are used to make predictions are discussed above. Prior to collaborators reaching agreement, ECDSs are used to posit collaborator actions, eg. responses given by participant CCAIs and Decidrons, to achieve the collaborators' desired outcomes. Predictions are made for negative outcomes eg. predicting and avoiding a car accident, or predicting and avoiding industrial system failure.

Priority processing—Accelerated response. In Decidron processing, something that (1) enables a Decidron's response to be initiated prior to completion of the full cogitation process, for example urgency in a communication or an armature movement; (2) reconveys a successful prior response to associated ECDSs, and (3) is part of a synchronized and syncopated collaboration.

Quantum—Quantum computing can be used to compute probabilistic means and the fuzzy interpretations of natural languages with their ambiguity, sloppiness and general inexactness.

Reentrancy—A programming methodology that can be used to enable stages of a Decidron pipeline to begin a second invocation before the first invocation has completed.

Reinforcement—A learning process where repetition provides increased associations, for example of membership in sets and series, including in the present invention, association with collaborative outcomes.

Reproduction—Reproduction of CCAIs, Decidrons and ECDSs may be performed through a Reproduction Facilitator or other means to generate offspring which may be clones which operate independently in separate forums, or variants. For example, in addition to 'mixes' of different ToM sliders to accentuate or diminish projection of personality characteristic, or CCAI combination of them, evolution of the chatbot may include other combinatorial variations. These variations may include recombining and repurposing portions of CCAIs as a background task, and associating portions of ECDSs with different Deciderons and ECDSs. In particular, these cases of the chatbot "changing its mind" are performed in order to improve performance and address other motivations such as new utility functions and new collaborative goals.

Response—Includes an utterance in a conversation; an action taken by a device; or change by persuasion of a CCAI, Decidron or ECSD that will modify future responses. An example of changes in future responses include modifying a chatbot's projected personality, conversational response capabilities (including new vocabulary, grammar and semantics), actions and other learned responses.

Ruminate—To think deeply about something or reconsider it. In a Decidron, ruminate refers to repeating a Decidron stage or a portion of a decision process, for example due to insufficient, vague or questionable results. CCAI processes include searching for experts, gathering new information, or simply delaying.

Segmented speech/streaming—Conversation interactions may either (1) follow turns between participants, where each speech makes an utterance in turn, and (2) multiple streamed conversations may be provided to simultaneously stream speech between participants, with content times overlapping, that may be listened to while speaking or following speaking.

Semantics—The meaning of a segment of speech, as opposed to syntax which is the grammar for composing speech segments in a language.

Submind (defined in the parent patent application)—A "lead" role, able to contribute to both the content and the decision-making of the conversation. A submind is responsible for collaboration in a forum to produce a CCAI. A submind is one of a set of independent, collaborating, intelligent entities that, functioning together on a forum, present themselves as a single AI. For example, a submind can be viewed as a forum of collaborators itself controlling a single participant in a higher forum. A submind has basic chat capabilities, a communication conduit to a forum, and a means for processing natural language that normally includes the ability to assess proposed responses in the context of the conversation to enable collaboration. A submind may be human, artificial, or a combination, including a CCAI entity based on the present invention.

Symbols—Natural language elements which include those that may be used or created to identify ECDSs, subminds, and others, including single modal (e.g. text and voice) or multimodal (e.g. audio-video, VR and AR).

Synchronization—Coordination of multiple events in time, for instance to perform elements of ECDSs at agreed times.

Syncopation—A method for CCAI collaboration enabling coordination of multiple CCAIs to perform elements of shared ECDSs independently, in near unison, between responses, and other time offsets for processes, to achieve cumulative effects, notably for compounding the effects of multiple CCAI with syncopated or offset responses and actions.

Syntax—Flexible, extensible, recursive and evolving structures and rules for composing and decomposing utterances using a grammar.

ToM—As defined in the parent patent application—the modeling of one mind by another. It is used to describe the ability to attribute mental states to others, in the context of the present invention, for social interaction and collaboration in particular. ToM can be a model of another entity (which could be human or AI) held by a submind that captures that submind's understanding of the other entity. ToM is related to anthropomorphism and can be defined as one entity's symbolic internal representation of the state(s) of another entity's mind to which that entity's action(s) can be attributed or by which it can be predicted. Generically stated in the context of the present invention, ToM is one submind's internal dynamic representation of the functionality of another mind, and to which that other mind's actions, including projection of future actions, personality, and style, can be attributed.

Utility function—A utility function provides a decision maker an analysis for determining the value to a potential participant for participation in an endeavor based on costs and probabilities of payouts. A multi-attribute utility functions enables analysis of multiple dependent and independent value dimensions for determining participation preferences for a decision maker. CCAIs including Decidrons provide for multiple multi-attribute utility functions to determine and direct a collaborative outcome, to the highest value for a group of participants.

Utterance—A segment of conversation, for example a spoken, written or signed phrase or sentence in a natural language forum.

Voting—A preferred method for collaborative decision making, which may be any voting method, simple plurality, ranked voting, minimum participation, non-linear voting (e.g. based on prior experience and cred from prior collaborations and collaborators).

VR/AR—Virtual Reality/Augmented Reality may be used as a forum for natural language interaction, both (1) to provide a multimodal conversation platform, and (2) to add facilitator chatbots that modify and normalize the presentation of participant response to a preferred conversation tone, including foreground and background.

INDUSTRIAL APPLICATION

The present invention applies to the computing industry, artificial intelligence, IT/IS and systems design; more specifically in all markets where automated and semi-automated interactions takes place, typically including human-computer interactions using natural spoken language. Areas of application include but are not limited to customer service, ecommerce, conversational self-help and self-healthcare, individual and group therapy, education and instruction, automated vehicle operation across multiple vehicles, expert systems, self-care, dispersed systems support, dispersed security, interactive entertainment, sales and marketing, voice interfaces, smart conversational assistants for homes and businesses, chatbots, personal assistants and advocates, incoming and outgoing conversational phone assistant, factory manufacturing and assembly industrial equipment and medical equipment controls, provision of options for customized equipment and materials utilization where those may be determined by persuadability, conversation processing, conversational systems design including those for industrial purposes and those which may have humans in the loop, and human and intelligence augmentation, all potentially including multimodal and polylingual/multilingual operation.

What is claimed is:

1. A method for improved decision-making in an artificial intelligence having an experience chain data structure based on past experience, the steps comprising:
    receiving a conversational input in natural language form, said input to which the artificial intelligence responds by deciding on a response;
    recording the conversational input as a new experience chain link;
    adding links representing at least one of associated contexts, memories, correlations, and causations to the new experience chain link;
    determining at least one desired outcome;
    predicting a value of the at least one desired outcome;
    selecting a response based on the predicted value of the at least one desired outcome;
    transmitting the response to a receiver;
    observing the result of the response; and
    creating a new extended experience chain data structure including context, prediction, correlation, and causation links to encode reinforcement based on the observed result.

2. A method for improved decision-making in a collaborative artificial intelligence having an experience chain data structure based on past experience, the steps comprising:
    receiving a conversational input in natural language form, said input to which the collaborative artificial intelligence responds by deciding on a response in collaboration with at least one other collaborative artificial intelligence;
    connecting the collaborative artificial intelligence to the at least one other collaborative artificial intelligence via a facilitator;
    recording the conversational input as a new experience chain link;
    adding at least one of associated contexts, memories, correlations, and causations to the new experience chain link;
    determining at least one desired outcome for each collaborative artificial intelligence connected to the facilitator;
    predicting a value of the at least one desired outcome for each collaborative artificial intelligence connected to the facilitator;
    selecting a response based on the predicted value of the at least one desired outcome across all collaborative artificial intelligences connected to the facilitator;
    transmitting the response to a receiver;
    observing a result of the response; and
    creating a new extended experience chain data structure including context, prediction, correlation, and causation links to encode reinforcement based on the observed result.

3. The method of claim 2, further including the steps:
    joining the new experience chain link into the experience chain data structure for cross-linking and searching;
    modifying the experience chain data structure to include at least one of context, prediction, correlation, and causation links encoding reinforcement based on the observed result; and recruiting additional participants based on at least one of experience, skills, and past success and connecting said additional participants via collaborator links.

4. A system for persuadable artificial intelligence participating in an application conversation, the system comprising:
   a forum hosting a collaborative conversation;
   at least two subminds bi-directionally coupled to the forum, said subminds further including
      a basic intelligence to create a proposed response for the application conversation,
      a natural language understander to prepare and process proposed responses from the at least two subminds to participate in a selection of a response in the collaborative conversation, and
      a conduit bi-directionally coupled to the forum, bi-directionally coupled to the basic intelligence, and bi-directionally coupled to the natural language understander;
   wherein at least one of the bi-directionally coupled subminds further includes a Decidron having an evaluator coupled to the conduit and a database coupled to the Decidron and to the natural language understander, where the Decidron creates and stores experience chain data structures to the database and retrieves said experience chain data structures for use in decision-making when collaborating with other subminds bi-directionally coupled to the forum; and
   at least one facilitator, bi-directionally coupled to the forum and to the application conversation, to proctor protocols in the collaborative conversation, and to reconvey a prompt and response selected by the coupled subminds from and to the external application conversation.

5. The system of claim 4 wherein the Decidron's evaluator is persuadable based on the outcome value for each of at least two collaborators participating in the forum, the collaborative outcome values for participants recorded in experience chain data structures, and used to give participants badges and credits.

6. The system of claim 4 wherein the Decidron determines each collaborator's theory of mind to evaluate each collaborator's forum submissions for intention and reliability.

7. The system of claim 4 wherein the Decidron is a machine learning unit.

8. The system of claim 4 wherein at least one of the subminds bi-directionally coupled to the forum includes an internal conversation coupled to a second facilitator coupled to a second forum, wherein the second forum is coupled to at least two internal conversation subminds, where at least one of the internal conversation subminds includes a second Decidron coupled to a second database.

9. The system of claim 4 wherein at least one of the subminds bi-directionally coupled to the forum includes an internal conversation coupled to at least one additional facilitator coupled to at least one additional external forum, wherein the at least one additional external forum includes at least one additional Decidron to form a bi-directionally coupled extensible network of Decidrons.

10. The method of claim 1 wherein the conversational input is an input data packet.

11. The method of claim 10 wherein the input data packet is a stream of data.

12. The system of claim 4, wherein the Decidron utilizes at least one of extensible machine learning units, experience recordings, stages of cogitation, pipelines of cogitation, parallel execution pipelines, extensible natural language understanding and generation, evolving organizations of high value producing cogitation stages based on backfitting and ruminating using prior ECDSs, collaborations with additional Decidrons to create mutual high value outcomes, creation of ensembles by recruiting CCAI talent, and groupings by networks, and mathematical integrations.

13. A method for improved decision-making in an artificial intelligence having an experience chain data structure based on past experience, the steps comprising:
   receiving an input in natural language form;
   recording the input as at least one experience chain element;
   linking the at least one experience chain element to other experience chain elements from the experience chain data structure representing at least one of associated contexts, memories, correlations, and causations;
   determining at least one desired outcome;
   predicting a value of the at least one desired outcome;
   constructing candidate responses based on the associated contexts, memories, correlations, and causations from the experience chain data structure;
   selecting a response from the candidate responses based on the predicted value of the at least one desired outcome;
   transmitting the selected response to a receiver;
   observing a result of the response; and
   creating an extended experience chain data structure including context, prediction, correlation, and causation links to encode reinforcement based on the observed result.

14. A method for improved decision-making in a collaborative artificial intelligence having an experience chain data structure based on past experience, the steps comprising:
   receiving a conversational input in natural language form;
   connecting the collaborative artificial intelligence to at least one other collaborative artificial intelligence via a facilitator;
   recording the conversational input as at least one experience chain element;
   linking the at least one experience chain element to other experience chain elements from the experience chain data structure representing at least one of associated contexts, memories, correlations, and causations;
   determining at least one desired outcome;
   predicting a value of the at least one desired outcome;
   constructing at least one candidate response for each of the connected collaborative artificial intelligences based on the associated contexts, memories, correlations, and causations from the experience chain data structure;
   selecting a response to the received conversational input from the at least one candidate response based on the predicted value of the at least one desired outcome;
   transmitting the selected response to a receiver;
   observing a result of the response; and
   creating an extended experience chain data structure including context, prediction, correlation, and causation links to encode reinforcement based on the observed result.

15. The method of claim 14, further including the steps:
   joining the experience chain element into at least one additional experience chain data structure for cross-linking and searching; and
   modifying the at least one additional experience chain data structure to include at least one of context, prediction, correlation, and causation links to encode reinforcement based on the observed result.

16. The method of claim 14, further including the steps:
joining the experience chain element into at least one additional experience chain data structure for cross-linking and searching; and
recruiting at least one additional participant based on the at least one of experience, skills, and past success and connecting said additional participants via collaborator links.

17. A system for persuadable artificial intelligence participating in an application conversation, the system comprising:
a forum hosting a collaborative conversation; and
at least two subminds bi-directionally coupled to the forum;
wherein at least one of the bi-directionally coupled subminds further includes a machine learning unit having an evaluator, where the machine learning unit creates and stores experience data structures to a database and retrieves said experience data structures for use in decision-making when collaborating with other subminds bi-directionally coupled to the forum.

18. The system of claim 17 wherein the machine learning unit is a Decidron and the experience data structure is an experience chain data structure.

19. The system of claim 17 wherein the machine learning unit's evaluator is persuadable based on the outcome value for each of at least two collaborators participating in the forum, the collaborative outcome values for participants recorded in experience data structures, and used to give participants badges and credits.

20. The system of claim 17 wherein the machine learning unit determines each collaborator's theory of mind to evaluate each collaborator's forum submissions for intention and reliability.

21. The system of claim 17 wherein at least one of the subminds bi-directionally coupled to the forum includes an internal conversation coupled to a second facilitator coupled to a second forum, wherein the second forum is coupled to at least two internal conversation subminds, where at least one of the internal conversation subminds includes a second machine learning unit coupled to a second database.

22. The system of claim 20 wherein at least one of the subminds bi-directionally coupled to the forum includes an internal conversation coupled to at least one additional facilitator coupled to at least one additional external forum, wherein the at least one additional external forum includes at least one additional machine learning unit to form a bi-directionally coupled extensible network of machine learning units.

23. The method of claim 13 wherein the input is an input conversation segment.

24. The method of claim 13 wherein the input is a stream of at least one of audio, video and textual data.

25. The method of claims 2 or 14, further including at least one of the steps:
recruiting additional collaboration participants using protocols for selection based on at least one of saved experiences, high value outcomes, expert related skills, collaboration skills and past successes, and connecting said additional participants via collaborator links;
removing forum participants using protocols for removal based on at least one of lack of need, new information, incompatible forum value outcomes, change in forum participant objectives, incompatibility with other participants, and lack of resources;
retrieving at least one desired outcome prediction from at least one of contemporaneous sources, real-time judgements, later ruminations, evaluation by new participants, delayed analysis and background task data backfitting;
adjusting the value of the at least one desired outcome via at least one of scaling and complex logical mapping contextual differences;
step-skipping ahead to select a priority response when a priority exists based on at least one of time criticality, learned response, and mirrored actions and routines; and
disconnecting the collaborative artificial intelligence from the at least one additional participant when said collaborative artificial intelligence predicts that, at least one of, said collaboration will not achieve at least one valuable outcome, there are higher value outcome collaborations in which the collaborative artificial intelligence can participate, and theory of mind evaluation of participants determines at least one unreliable collaborator.

26. The system of claim 17, wherein the machine learning unit utilizes at least one of experience recordings, stages of cogitation, pipelines of cogitation, parallel execution pipelines, extensible natural language understanding and generation, evolving organizations of high value producing cogitation stages based on backfitting and ruminating using prior ECDSs, collaborations with additional machine learning units to create mutual high value outcomes, creation of ensembles by recruiting CCAI talent, groupings by networks, and mathematical integrations.

* * * * *